United States Patent
Rastegar et al.

(10) Patent No.: US 7,609,289 B2
(45) Date of Patent: Oct. 27, 2009

(54) METHODS AND APPARATUS FOR CAPTURING IMAGES WITH A MULTI-IMAGE LENS

(75) Inventors: Jahangir S. Rastegar, Stony Brook, NY (US); Robert S. Smeza, Stony Brook, NY (US)

(73) Assignee: Omnitek Partners, LLC

( * ) Notice: Subject to any disclaimer, the term of this patent is extended or adjusted under 35 U.S.C. 154(b) by 725 days.

(21) Appl. No.: 10/950,240

(22) Filed: Sep. 27, 2004

(65) Prior Publication Data

US 2005/0168616 A1 Aug. 4, 2005

Related U.S. Application Data

(60) Provisional application No. 60/505,835, filed on Sep. 25, 2003.

(51) Int. Cl.
*H04N 7/00* (2006.01)
*H04N 5/225* (2006.01)

(52) U.S. Cl. .................................. 348/36; 348/218.1
(58) Field of Classification Search .................. 348/36, 348/337, 340, 218.1
See application file for complete search history.

(56) References Cited

U.S. PATENT DOCUMENTS

| 5,023,725 A * | 6/1991 | McCutchen .................. 348/38 |
| 6,801,257 B2 * | 10/2004 | Segev et al. .................. 348/296 |
| 6,940,610 B2 * | 9/2005 | Prinzhausen et al. ......... 356/609 |

* cited by examiner

*Primary Examiner*—Tung Vo
*Assistant Examiner*—Anner Holder

(57) ABSTRACT

An apparatus for imaging a scene is provided. The apparatus including: a charged coupled device (CCD) in optical communication with the scene along an optical path; a multi-image lens disposed in the optical path, the multi-image lens having two or more facets, each facet transmitting an image of the scene to the CCD; and a device which isolates one of the images from each of the two or more facets, such that only the isolated image is incident upon the image capturing means at any instant.

17 Claims, 19 Drawing Sheets

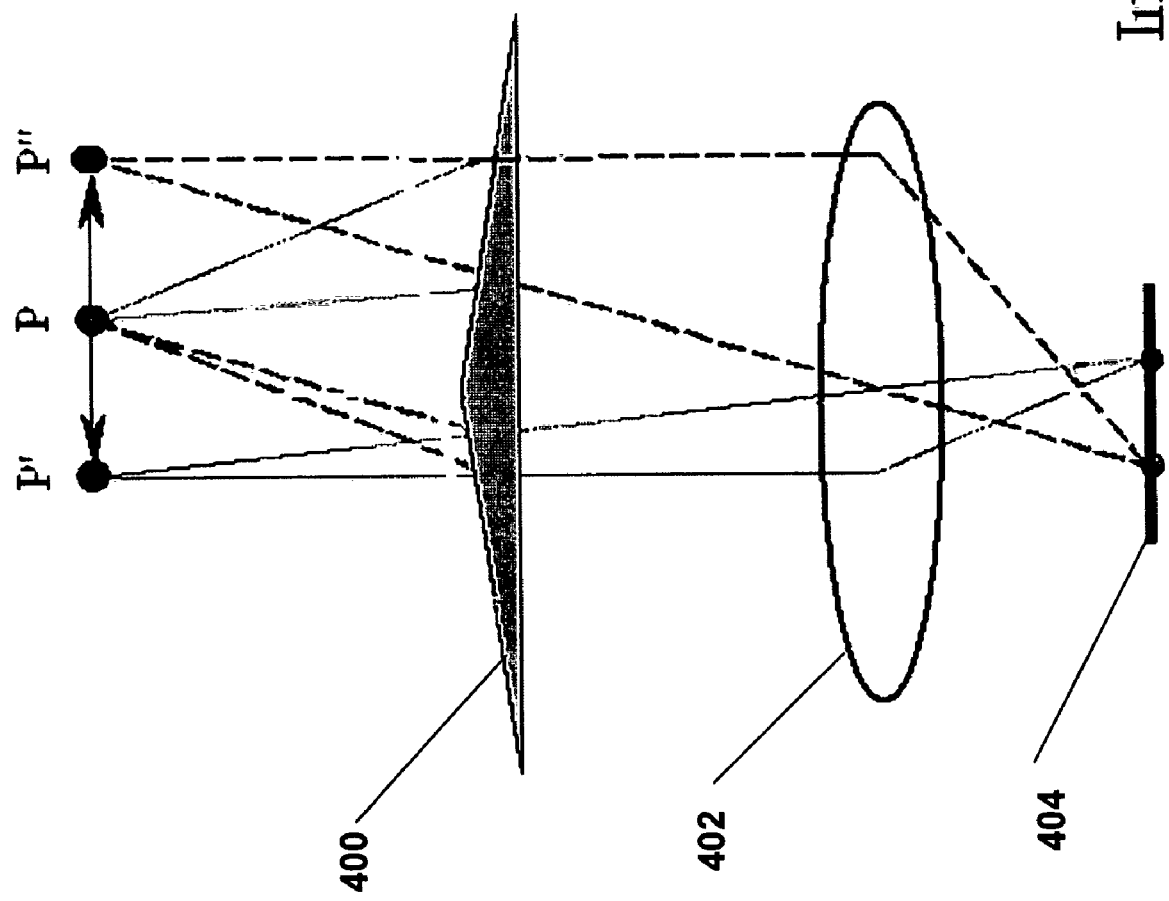

METHODS AND APPARATUS FOR CAPTURING IMAGES WITH A MULTI-IMAGE LENS

CROSS-REFERENCE TO RELATED APPLICATIONS

This application claims the benefit of earlier filed U.S. Provisional Application Ser. No. 60/505,835 filed on Sep. 25, 2003 and entitled "A Scanning Stereoscope Imaging System and Method," the entire contents of which is incorporated herein by its reference.

FIELD OF THE INVENTION

The present invention relates generally to methods and apparatus for capturing images with a multi-image lens, and more particularly, to methods and apparatus for omni-directional vision by using an arrangement of prisms whose corresponding images are optically isolated.

BACKGROUND OF THE INVENTION

Omni-directional vision systems have been investigated for a variety of fields, including surveillance, robotic navigation, and entertainment purposes. There have been many approaches to omni-directional, or panoramic, vision including moving cameras, wide-angle lenses, and curved mirrors.

While panoramic imaging methods have become increasingly popular in the commercial world, there is room for considerable improvement. For the most part, these systems are not space efficient, limiting their potential applications. Oftentimes, complications of having moving parts arise, increasing malfunctions and breakages. Furthermore, the use of wide-angle lenses and mirrors results in image distortions.

SUMMARY OF THE INVENTION

It is an object of the present invention to provide methods and apparatus for omni-directional vision, which overcome the problems associated with the prior art.

Accordingly, an apparatus for imaging objects is provided. The apparatus comprising: a multi-image lens having two or more facets, each facet imaging the objects along a different optical axis; an image capturing means in optical communication with the different optical axes for capturing the imaged objects from each of the two or more facets; and means for sequentially isolating one of the images from each of the two or more facets of the multi-image lens, such that only the isolated image is incident upon the image capturing means.

The multi-image lens can be a biprism having two facets on one side thereof. The multi-image lens can also have five facets on one side thereof.

The image capturing means can be a charged coupled device (CCD).

The means for sequentially isolating one of the images from each of the two or more facets of the multi-image lens can comprise: an electrochromic shutter associated with each of the two or more facets; and a processor for sequentially closing all but one of the electrochromic shutters. Alternatively, the means for sequentially isolating one of the images from each of the two or more facets of the multi-image lens can comprise: a filter associated with each of the two or more facets for filtering a characteristic of radiation transmitted through the two or more facets; a radiation source; and a processor for sequentially operating the radiation source such that all but one of the filters prevent transmission of radiation from the radiation source.

The characteristic can be a wavelength of the radiation from the radiation source. Alternatively, the characteristic can be a polarization of the radiation from the radiation source. As yet another alternative, the means for sequentially isolating one of the images from each of the two or more facets of the multi-image lens can comprise: a mechanical shutter associated with each of the two or more facets; and a processor for sequentially closing all but one of the mechanical shutters.

The apparatus can further comprise a processor for processing each of the isolated images to construct a wide field of view image of the objects, construct a video image of the objects and/or determine depth measurements for the objects. Where depth measurements are determined, the processor can further generate a three-dimensional rendering of the objects from the determined depth measurements.

The multi-image lens can be a unitary lens or a plurality of lens.

Also provided is a method for imaging objects. The method comprising: imaging the objects along at least two different optical axes; sequentially isolating images of the objects from each of the optical axes; and capturing each of the isolated images of the objects.

The method can further comprise processing each of the isolated images to construct a wide field of view image of the objects, a video image of the objects and/or determine depth measurements for the objects. Where depth measurements are determined, the processing can further generate a three-dimensional rendering of the objects from the determined depth measurements.

Still provided is an apparatus for imaging a scene. The apparatus comprising: a charged coupled device (CCD) in optical communication with the scene along an optical path; a multi-image lens disposed in the optical path, the multi-image lens having two or more facets, each facet transmitting an image of the scene to the CCD; and a device which isolates one of the images from each of the two or more facets, such that only the isolated image is incident upon the image capturing means at any instant.

Still yet provided is an endoscope comprising: a multi-image lens having two or more facets, each facet imaging the objects along a different optical axis; an image capturing means in optical communication with the different optical axes for capturing the imaged objects from each of the two or more facets; and means for sequentially isolating one of the images from each of the two or more facets of the multi-image lens, such that only the isolated image is incident upon the image capturing means.

Still further yet is provided an endoscope comprising: a charged coupled device (CCD) in optical communication with a scene along an optical path; a multi-image lens disposed in the optical path, the multi-image lens having two or more facets, each facet transmitting an image of the scene to the CCD; and a device which isolates one of the images from each of the two or more facets, such that only the isolated image is incident upon the image capturing means at any instant.

BRIEF DESCRIPTION OF THE DRAWINGS

These and other features, aspects, and advantages of the apparatus and methods of the present invention will become better understood with regard to the following description, appended claims, and accompanying drawings where:

FIG. 1a illustrates an embodiment of a multi-image lens for use in the apparatus and methods of the present invention.

FIG. 1b illustrates a section view of the multi-image lens of FIG. 1a as taken about line 1b-1b in FIG. 1a.

FIGS. 6a and 6b illustrate depth measurement using an apparatus of the present invention.

DETAILED DESCRIPTION OF THE PREFERRED EMBODIMENT

Considered broadly, the apparatus and method according to the present invention use one or more arranged prisms, in the form of a multi-image lens, to provide a plurality of optical axes from which a panoramic image can be constructed. For the purposes of this disclosure, a multi-image lens is any optical lens having two or more facets. Furthermore, the same effects as a multi-image lens can be achieved with other constructions known in the art, such as with mirrors. Thus, the term "multi-image lens" as used herein is intended to cover such equivalent constructions.

Figure 1:
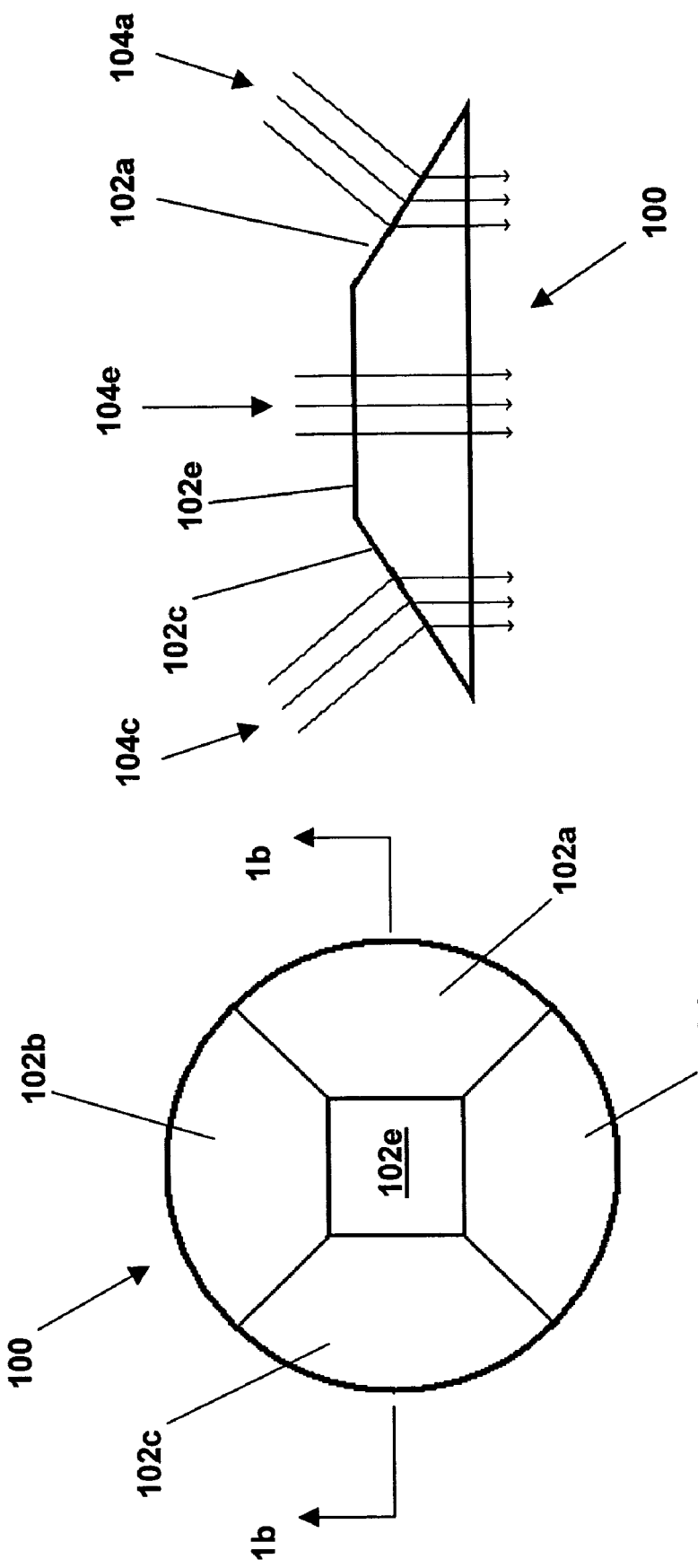

One formation of a multi-image lens is shown in FIG. 1a, with a cross-sectional view illustrating the optical axes thereof in FIG. 1b. The multi-image lens 100, alternatively referred to as a prism, illustrated in FIG. 1a has 5 facets. The outer facets are referred to by reference numerals 102a-102d and the central facet is referred to by reference numeral 102e. The optical axes of each of the facets 102a-102e are referred to by reference numeral 104 with a letter suffix corresponding to the facet. For example, the optical axes for facet 102a are referred to by reference numeral 104a. Although the multi-image lens 100 of FIG. 1 is shown as a unitary lens, the same can be constructed of individual prisms (such as that shown with dotted lines in FIG. b).

The resultant image from a multi-image lens 100, such as that shown in FIGS. 1a and 1b is a mosaic of images from each individual facet 102a-102e of the multi-image lens 100. In the multi-image lens 100 shown in FIGS. 1a and 1b, there would be five images, each corresponding to a facet 104a-104e and each with a slightly different perspective with some common areas of overlap.

Figure 2:
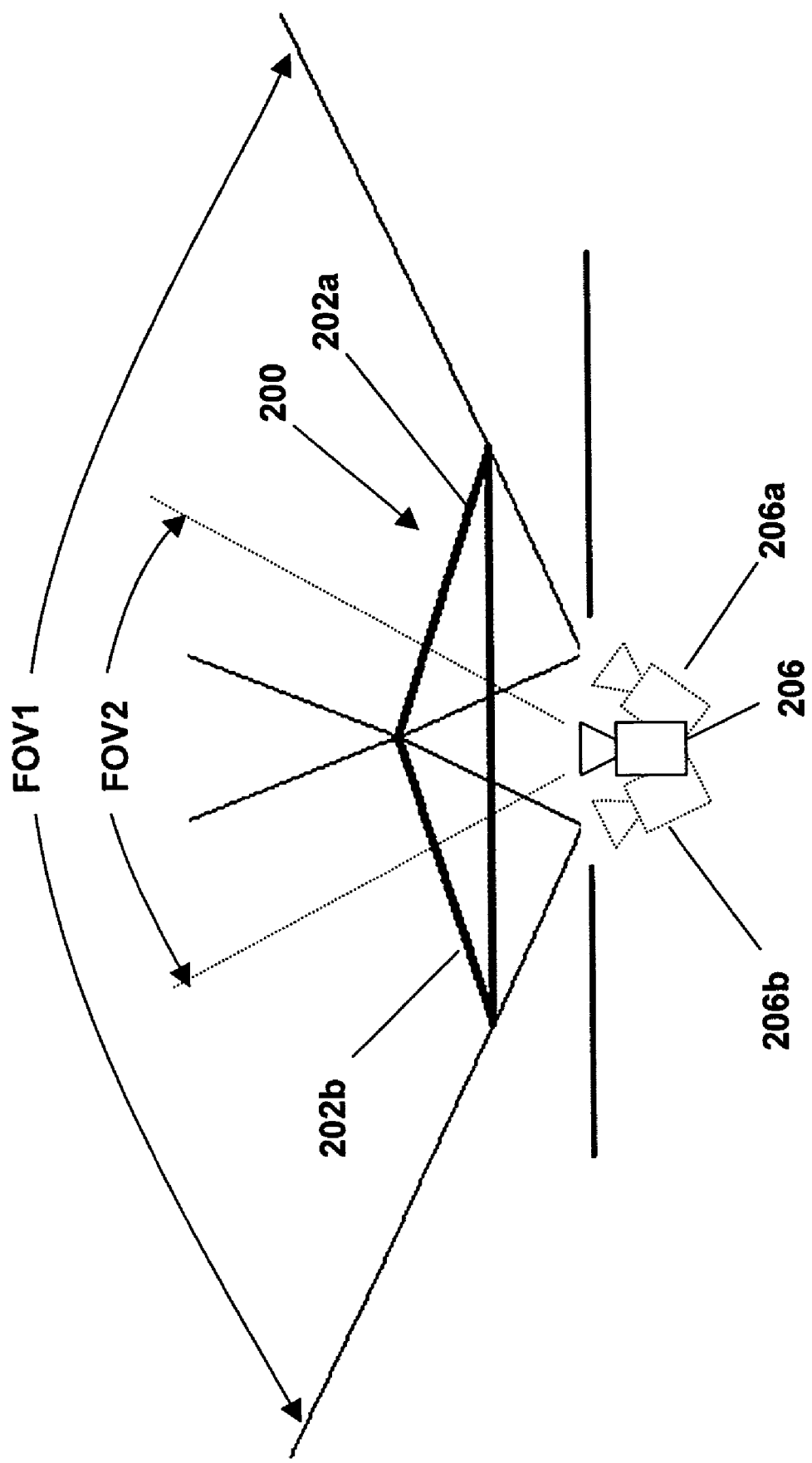
FIG. 2 illustrates a multi-image lens in the form of a biprism and a camera for imaging an object or scene through such biprism.
Figure 3:
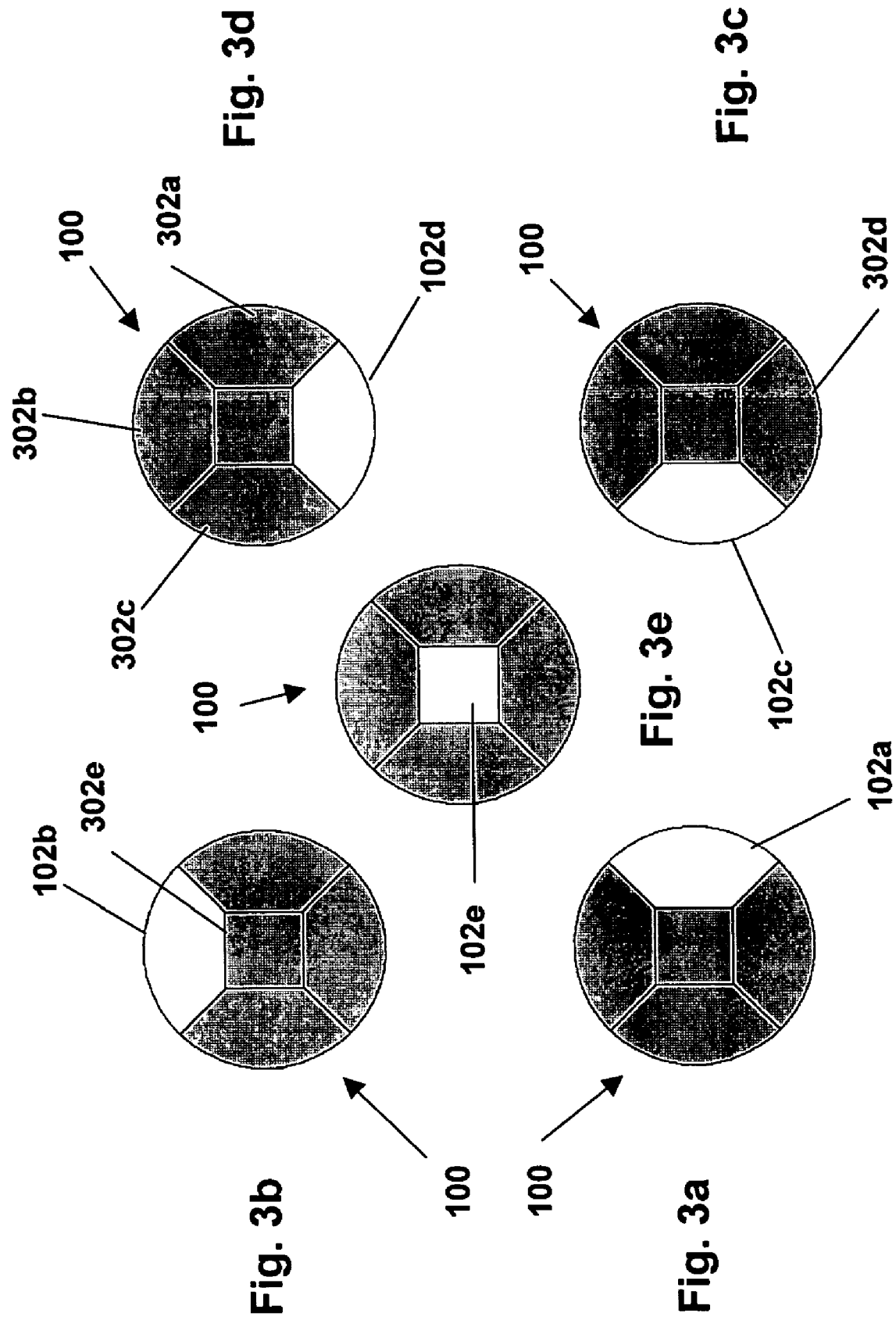
FIGS. 3a-3e illustrate the multi-image lens of FIG. 1a having an electrochromic shutter associated with each facet, the electrochromic shutters being shown shaded in an on state and without shading in an off state.
Figure 4:
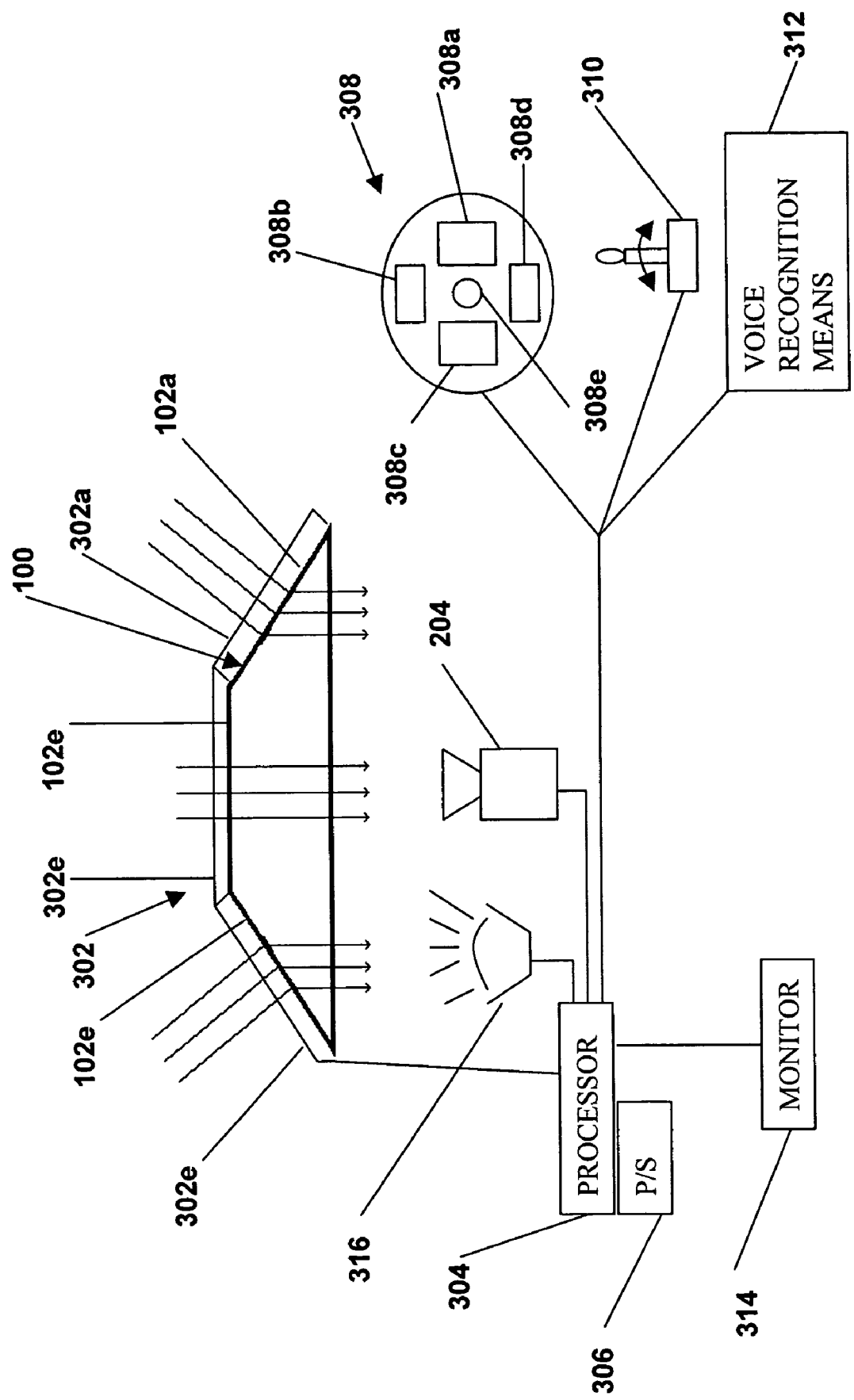
FIG. 4 illustrates a sectional view of the multi-image lens of FIG. 1 as part of a system for imaging a scene with such lens.

FIG. 2 is provided to better understand the mechanism of a multi-image lens. FIG. 2 illustrates a multi-image lens 200 having two facets 202a, 202b (known in the art as a biprism). A single camera 204 behind the multi-image lens 200 of FIG. 2 is equivalent to two virtual cameras 206a, 206b facing diverging directions. That is, the image viewed from the camera 204 is equivalent to an image as it would appear if viewed from virtual camera 206a and an image as it would appear if viewed from virtual camera 206b. As can be seen from FIG. 2, the field of view FOV1 of the camera 204 and multi-image lens 200 combination is much greater than the FOV2 of the camera 204 without the multi-image lens 200.

In the case of a multi-image prism, however, the images from each of the facets of the prism are projected onto a common camera. As a result, there are areas on the camera's light sensor array that receive input from multiple sources (the prism facets). This results in blurring at the interfaces of the facet images in the mosaic. The apparatus and methods of the present invention remedy such a blurring effect.

The methods and apparatus of the present invention use a means (referred to generally by reference numeral 302 (see FIGS. 3a-3e and 4) for isolating one of the images from each of the facets of the multi-image lens. Although the examples given below use the same means 302 for each of the facets of a multi-image lens, such is described by way of example and not to limit the scope or spirit of the invention as such. Those skilled in the art will appreciate that the different means 302 for isolating one of the images from each of the facets of the multi-image lens can be used within the same multi-image lens. Examples of such means are discussed below.

The multi-image lens provides an increased range of vision as well as overlapping segments necessary for the calculation of dimensional measurements. The individual facets of the multi-image lens provides views from more extreme angles with less distortion than traditional methods such as standard and fisheye lenses. The multi-image lens is mounted on or otherwise associated with a digital camera or other image capturing means (including the human eye).

As is expected, an amount of blur can occur at the image plane at the borders of images from each facet. The addition of optical switches (means 302) in this arrangement provides clear views from each facet, and facilitates computer analysis of the images.

Referring to FIGS. 3a-3e and 4, the means 302 for isolating one of the images from each of the facets of the multi-image lens comprises an electrochromic shutter 302a-302e associated with each of the facets 102a-102e of the multi-image lens 100. The electrochromic shutters 302a-302e are shown shaded in an on state and without shading in an off state. The operation and construction of electrochromic shutters are well known in the art. Liquid crystals are injected between two sheets of transparent polarized material. These crystals are aligned such that they allow the passage of light. However, in response to an applied voltage, they untwist, resulting in blockage of light. Traditionally, the electric current is supplied via patterned electrodes. However, delineating "windows" can also be accomplished by creatively applying currents. In one example, facets are turned on and off by inverting the polarity of adjacent currents.

The electrochromic shutters 302a-302e can be fabricated separately and disposed on each facet 102a-102e or fabricated integrally with a surface of each facet 102a-102e. In general, an electrochromic shutter turns dark or clear in response to an applied electrical current. In this way, each of the facets 102a-102e of the multi-image lens 100 can be prevented from projecting an image onto the camera 204. Then, by sequential "opening" (capable of transmitting visible light) of the individual shutters 302a-302e, the images from each facet 102a-102e can be acquired one after the other. This operation is illustrated in FIGS. 3a-3e. The sequencing of the opening of each shutter 302a-302e is under the control of the processor 304, which also controls a power supply 306 for supplying the current to the shutters 302a-302e. The processor 304 can also be used to process the images, such as creating a video image or a panoramic view from the sequential images. The electrochromic shutters 302a-302e can also be operated manually by an operator. For example, if the user wishes to look right, all that needs to be done is to open the right window. Therefore, the user can manually open the right shutter 302a-302e with the operation of an indicating device, such as a switch 308, joystick 310 or voice recognition system 312. The switch can have individual switches or buttons 308a-308e corresponding to the operation of a shutter 302a-302e. The image(s) captured by the camera 204 can be displayed on a monitor 314 that is also preferably under the control of the processor but may also be directly driven by the camera 204.

Although, the apparatus of the present invention are described by way of a camera and/or display, the images from the multi-image lens 100 can be captured by any device, such as a CCD or other light sensitive device or by the human eye, such as through an eyepiece associated with the multi-image lens 200.

Although the apparatus illustrated herein do not have any additional optics beside the multi-image lens, optical components can be used between the camera (or other image capturing device including the eye) and the multi-image lens 200 and/or between one or more facets 102a-102e of the multi-image lens 200 and the object or scene being imaged. For example, an objective lens may be used to focus the images on the camera (or other image capturing device including the eye) and/or other optics may be used to change any optical characteristic of the object or scene being imaged or magnify or reduce the object or scene being imaged. For example, filters can be used to provide for better night vision or to emphasize objects in the scene having a certain color or heat profile. Furthermore, fiber optics can be used to transmit the images from the multi-image lens 200 to the camera 204, which may be remote from the multi-image lens 200.

The arrangement illustrated in FIGS. 3a-3e and 4 allows for directionality and panoramic vision without moving parts. A benefit of the electrochromic shutters 302a-302e is that the images acquired from each facet 102a-102e are isolated from one another, and image information is not lost due to the superposition of images. As discussed above, the images are also correlated to specific directions. That is, the image viewed at the camera 204 comes from the facet 102a-102e having the open shutter 302a-302e. Furthermore, since no mechanisms are needed, the apparatus can be packaged in a small volume and used for applications in which such is desirable, such as at a distal end of an endoscope or similar instrument.

In another embodiment, the means 302 for isolating one of the images from each of the facets of the multi-image lens comprises wavelength sensitive filters 302a-302e associated with the facets 102a-102e of the multi-image lens 100. Switching from facet to facet thus depends on varying the wavelength of illuminating light from a light source 316, which is also under the control of the processor 304. Although one light source 316 is shown having a variable wavelength, several can be provided, each producing a light having a different wavelength corresponding to the wavelength of each of the filters 302a-302e. For example, an infrared light will only produce an image from a facet associated with a filter that allows infrared light to pass, and so on. The specific wavelength ranges of the filters 302a-302e may be as narrow or broad as the application dictates. In general, selection of these ranges will be determined by the type of environment being viewed and the number of facets 102a-102e of the multi-image lens 100.

In one example, for a single biprism (a multi-image lens having two facets), one facet is covered with a filter which prevents light above visible light frequencies to pass and the other facet only allows infrared frequencies to pass. By varying the frequency of the illuminating light, one facet or the other would appear black, effectively the same result as using an electrochromic shutter design.

Advantages of this arrangement are the relative simplicity and lower cost of the optical filters (as compared with the electrochromic shutters). In addition, there is minimal switching delay, as this is only dependent on varying the illumination from the light source 316 (which is coordinated by the processor). An added benefit is that the switching mechanism is located externally, conserving space at a distal end of a device utilizing the multi-image lens apparatus.

Where the filters 302a-302b are used, the images obtained from each facet 102a-102e are not directly comparable, as they are taken under varying frequencies of light. Also, light in a specific frequency range may reveal certain qualities in a region but hide others. For example, a red light may artificially disguise a red object. Finally, other sources of light can cause interference, so a dark environment may be necessary. However these qualities may be advantageous and desirable in certain applications. Although, the means 302 for isolating one of the images from each of the facets of the multi-image lens is illustrated as filters 302a-302e having differing wavelengths, other characteristics of light can be used to "open" and "close" each facet window, such as polarization.

Another means 302 for isolating one of the images from each of the facets of the multi-image lens can be a mechanical type of shutter 302a-302e associated with each of the facets 102a-102e of the multi-image lens 100. Such mechanical shutters 302a-302e can be of any type known in the art. Such mechanical shutters 302a-302e generally require moving parts and are larger in physical size than the other means discussed above. However, MEMS mechanical shutters may be provided at each facet 102a-102e which may not suffer from the disadvantages of conventional mechanical shutters.

The choice of means 302 for isolating images depends on the desired application. One additional benefit of the methods and apparatus of the present invention is the ability to determine distances to objects by comparison of the views from the different facets 102a-102e. A property of the images resulting from a multi-image lens 100 is that three-dimensional information is retained. In other words, the multiple optical axes provide the multiple perspectives necessary to triangulate depth. This can be used to reconstruct the three-dimensional properties of objects in an image.

The ability to discern depth from multiple perspectives is well known in the art, and various techniques have been used to obtain these perspectives. Common arrangements have included multiple stationary cameras or a single moving camera, while more recent studies have used focus and blur to reconstruct the three dimensional information. The ability of depth reconstruction from closely spaced, but separate, viewpoints has also been demonstrated. This concept is extrapolated herein to an apparatus having a multi image lens.

However, it must first be determined that each facet of the multi-image lens indeed provides a different optical axis and hence multiple perspectives. If the optical axis is identical in each facet, then despite the image shifts, three-dimensional information would not be retained in the final images. Segments of a larger image can be made to look like image shifts, without actually having two separate perspectives.

Intuitively, however, we know that the images obtained from facets of a multi-image lens are in fact from multiple optical axes. This is because images at varying distances will shift by different amounts, and this is seen in the acquired images from a multi-image lens. In fact, it is this observation that allows for the implementation of deriving a depth map from the acquired images. Nonetheless, an analysis of the optics behind the multi-image lens reveals that three-dimensional information is retained, and can be extracted, from a bi-prism image. By extrapolation, the same can be said for multi-image lenses having more than two facets.

Figure 5:
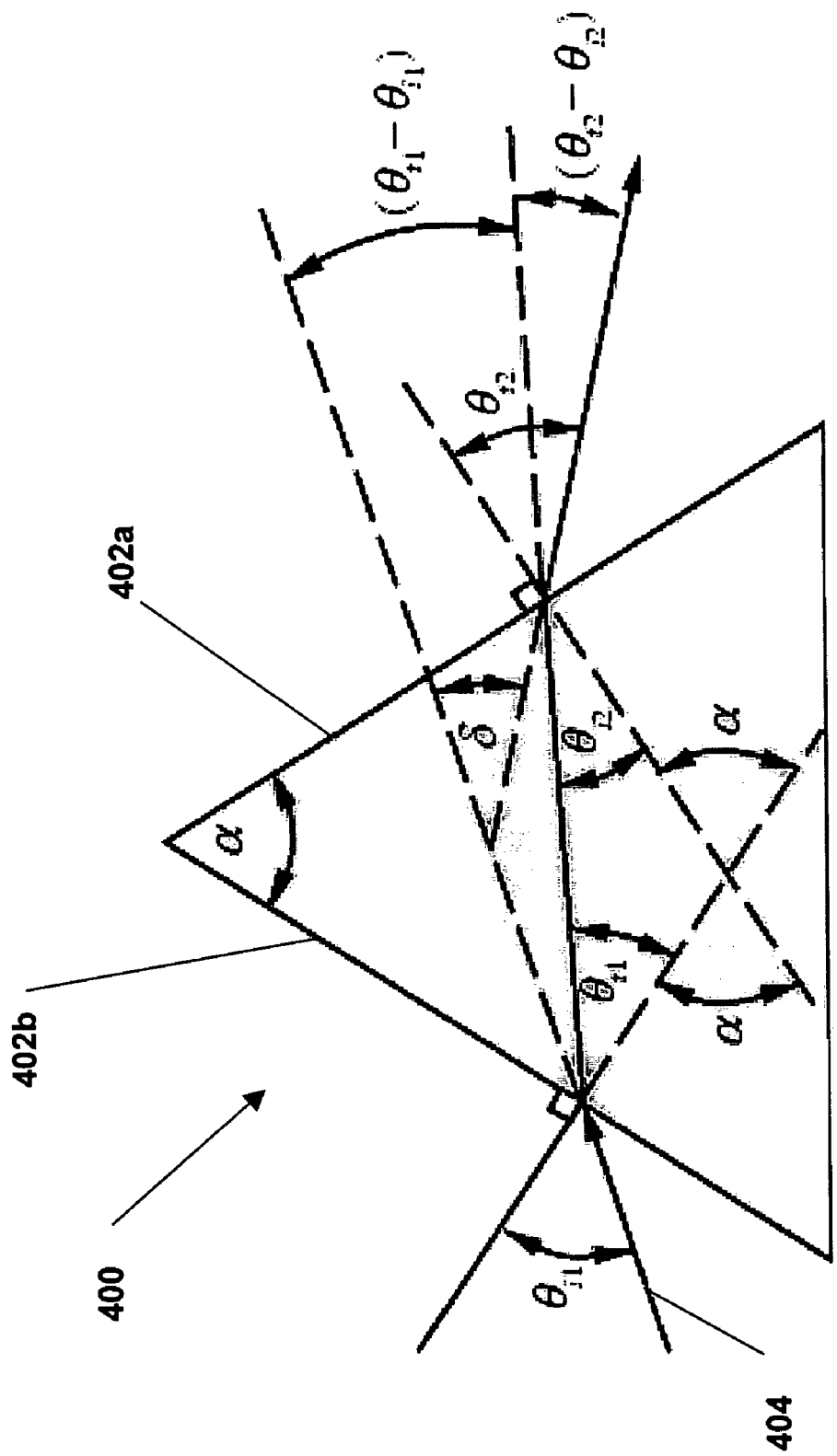
FIG. 5 shows the path of light through a biprism.

FIG. 5 shows the path of a ray of light through a bi-prism 400 having facets 402a and 402b. The incident ray 404 is incident on facet 402b and is refracted at two interfaces, with a final deviation of angle $\delta$. This angle is determined by the specific index of refraction of the prism and the incident angle. Within the prism, the light ray makes an angle $\theta_{t1}$ with the normal to the entry face of facet 402b and an angle of $\theta_{t2}$ with the normal to the exit face of facet 402a.

From geometry, we see that the angle $\alpha$ is related to $\theta_{t1}$ and $\theta_{t2}$. If we designate $\gamma$ to be the angle formed by the normals of the entry and exit faces, then:

$$\theta_{t1} + \theta_{t2} + \gamma = 180° \quad (1)$$

$$2\alpha + 2\gamma = 360° \quad (2)$$

$$\Rightarrow \alpha = \theta_{t1} + \theta_{t2} \quad (3)$$

From FIG. 5, it can also be seen that:

$$\delta = (\theta_{i1} - \theta_{t1}) + (\theta_{i2} - \theta_{t2}) \quad (4)$$

$$\Rightarrow \delta = \theta_{i1} + \theta_{i2} - \alpha \quad (5)$$

In order to relate the angle $\delta$ to the properties of the bi-prism 400 itself, it is necessary to incorporate Snell's law of refraction. A simplifying assumption is made that the external medium has an index of refraction of 1 ($n_{air} \approx n_{vacuum} = 1$). In this case:

$$\sin \theta_{i2} = n \sin \theta_{t2} \quad (6)$$

$$\sin \theta_{i1} = n \sin \theta_{t1} \quad (7)$$

Differentiating the equations (6) and (7), the following is obtained:

$$\cos \theta_{i2}\, d\theta_{i2} = n \cos \theta_{t2}\, d\theta_{t2} \quad (8)$$

$$\cos \theta_{i1}\, d\theta_{i1} = n \cos \theta_{t1}\, d\theta_{t1} \quad (9)$$

Dividing equation (9) by equation (8) results in:

$$\frac{\cos\theta_{i1}}{\cos\theta_{i2}} \frac{d\theta_{i1}}{d_{t2}} = \frac{\cos\theta_{t1}}{\cos\theta_{t2}} \frac{d\theta_{t1}}{d\theta_{t2}} \quad (10)$$

Assuming a minimum deviation value of $\delta$, equation (5) is differentiated with respect to $\theta_{t2}$ and it is set equal to zero:

$$\frac{d\delta}{d\theta_{t2}} = \frac{d\theta_{i1}}{d\theta_{t2}} + 1 = 0 \quad (11)$$

$$\Rightarrow \frac{d\theta_{i1}}{d\theta_{t2}} = -1 \quad (12)$$

Similarly, differentiating equation (3) with respect to $\theta_{t2}$ yields:

$$\frac{d\theta_{t1}}{d\theta_{t2}} + 1 = 0 \quad (13)$$

$$\frac{d\theta_{t1}}{d\theta_{t2}} = -1 \quad (14)$$

Substituting equations (14) and (12) into (1) gives:

$$\frac{\cos\theta_{i1}}{\cos\theta_{i2}} = \frac{\cos\theta_{t1}}{\cos\theta_{i2}} \quad (15)$$

Rewriting equation (6):

$$n \sin \theta_{t2} = \sin \theta_{i2} \quad (16)$$

$$\sin\theta_{t2} = \frac{\sin\theta_{i2}}{n} \quad (17)$$

$$\sin^2\theta_{t2} = \frac{\sin^2\theta_{i2}}{n^2} \quad (18)$$

$$1 - \cos^2\theta_{t2} = \frac{\sin^2\theta_{i2}}{n^2} \quad (19)$$

$$\Rightarrow \cos\theta_{t2} = \sqrt{1 - \frac{\sin^2\theta_{i2}}{n^2}} \quad (20)$$

Likewise, rewriting equation (7):

$$n \sin \theta_{t1} = \sin \theta_{i1} \quad (21)$$

$$\sin\theta_{t1} = \frac{\sin\theta_{i1}}{n} \quad (22)$$

$$\sin^2\theta_{t1} = \frac{\sin^2\theta_{i1}}{n^2} \quad (23)$$

$$1 - \cos^2\theta_{t1} = \frac{\sin^2\theta_{i1}}{n^2} \quad (24)$$

$$\Rightarrow \cos\theta_{t1} = \sqrt{1 - \frac{\sin^2\theta_{i1}}{n^2}} \quad (25)$$

Substituting equations (20) and (25) into (15):

$$\frac{\cos\theta_{i1}}{\cos\theta_{t2}} = \frac{\sqrt{1-\frac{\sin^2\theta_{t1}}{n^2}}}{\sqrt{1-\frac{\sin^2\theta_{t2}}{n^2}}} \quad (26)$$

$$\Rightarrow \frac{\cos^2\theta_{i1}}{\cos^2\theta_{t2}} = \frac{1-\frac{\sin^2\theta_{t1}}{n^2}}{1-\frac{\sin^2\theta_{t2}}{n^2}} \quad (27)$$

$$\Rightarrow \frac{1-\sin^2\theta_{i1}}{1-\sin^2\theta_{t2}} = \frac{1-\frac{\sin^2\theta_{t1}}{n^2}}{1-\frac{\sin^2\theta_{t2}}{n^2}} \quad (28)$$

$$\Rightarrow \frac{1-\sin^2\theta_{i1}}{1-\sin^2\theta_{t2}} = \frac{n^2-\sin^2\theta_{t1}}{n^2-\sin^2\theta_{t2}} \quad (29)$$

We know that n≠1, so by equation symmetry:

$$\theta_{i1}=\theta_{t2} \quad (30)$$

In addition, from equation (15) we also know:

$$\theta_{t1}=\theta_{i2} \quad (31)$$

Substituting equation (31) into (3) and equation (30) into (5):

$$\theta_{t1} = \frac{\alpha}{2} \quad (32)$$

$$\theta_{i1} = \frac{\delta+\alpha}{2} \quad (33)$$

Substituting into equation (7) gives:

$$\sin\left(\frac{\delta+\alpha}{2}\right) = n\sin\frac{\alpha}{2} \quad (34)$$

$$n = \frac{\sin\left(\frac{\delta+\alpha}{2}\right)}{\sin\frac{\alpha}{2}} \quad (35)$$

Figure 6B:
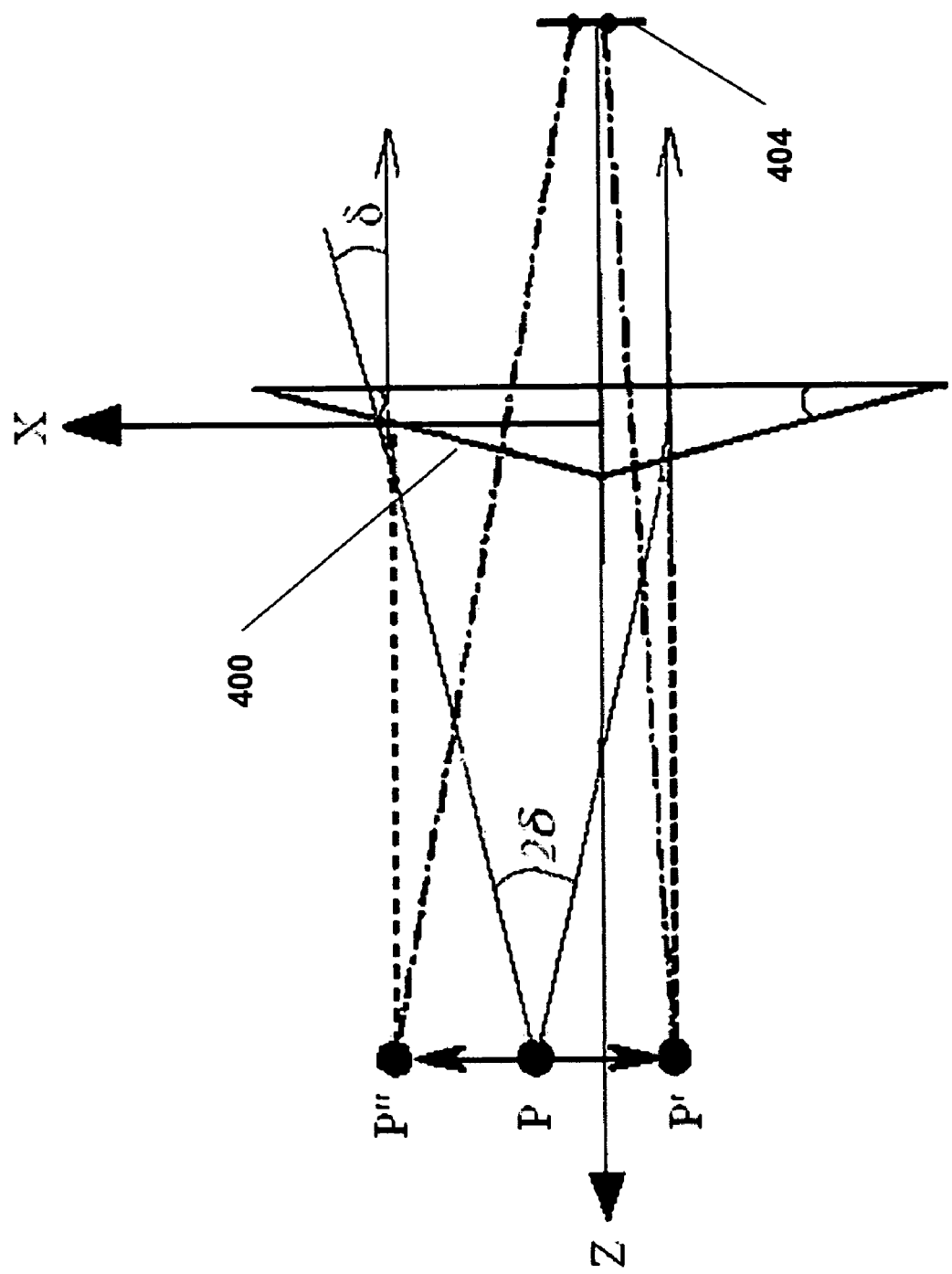

Equation (35) is the relationship between the deviation angle δ and the prism properties angle α and index of refraction n. Next this result is extrapolated to the examination of a biprism 400. In order to continue, the above result (equation 35) is taken and applied to the biprism 400. FIGS. 6a and 6b illustrate the geometry of a biprism 400 arrangement. It is convenient to describe the action of the biprism 400 as transforming a point (P) in space into two virtual points (P', P"). The light from these two virtual images is then focused by a lens 402 and finally captured by an image capturing means 404, such as a camera or CCD. The deviation angle δ referred to in the above equations is the angle between the actual point and the virtual point. The image capturing means records only two-dimensional images but, as will be shown, the image from the biprism 400 retains the necessary three-dimensional information.

From FIGS. 6a and 6b, it can be seen that:

$$P'_x = P_x + P_z \tan\delta \quad (36)$$

$$P''_x = P_x + P_z(-\tan\delta) \quad (37)$$

The distance between the two virtual points can therefore be related to the depth of the real point $P_z$. This is given as:

$$P_z = \frac{2\tan\delta}{P'_x - P''_x} \quad (38)$$

where δ is defined by equation (35)

Therefore, the images from the biprism 400 preserve the three-dimensional information necessary to perform depth calculations for objects in a scene.

The equivalent camera system of the biprism 200 is one of diverging stereo (as shown in FIG. 2). Points along the axis of the camera 204 are transformed into virtual points corresponding to virtual cameras 206a, 206b. The effective baseline between virtual cameras 206a, 206b is increased with increasing distance from the biprism 200 to the camera 204 and increasing biprism angle of the biprism 200.

While most stereo camera setups are converging, the diverging arrangement sacrifices size of image overlap for increased field of view. In terms of depth calculations, the equations remain the same, but calculations can only be made for overlapping fields of view. However, human eyes rely solely on convergent stereo, so any diverging stereo images must be processed to induce human perception of depth. Once three-dimensional coordinates are established for all points in a scene, the appropriate perspective views can then be extracted out for an appropriate viewing method. In summary, an image is obtained through multi-image prism apparatus. A depth mapping is determined from disparity of corresponding points between reference frames. Real world coordinates are determined for points in the image from the calculated distance values and left and right side views are constructed corresponding to the converging nature of human eyes. The right and left side images can then be viewed through appropriate 3-D viewing apparatus as are known in the art.

To accommodate the wavelength filter design, it is necessary to use a digital camera sensitive to the infrared region. Most commercially available digital cameras have charge-coupled devices (CCDs) that are sensitive to the infrared as well as the visible spectrum. The difficulty is that these cameras are also coupled with an infrared filter to prevent infrared bleeding in to the image. Therefore, a digital camera was modified such that the infrared filter only covered one facet of a biprism lens.

Figure 7:
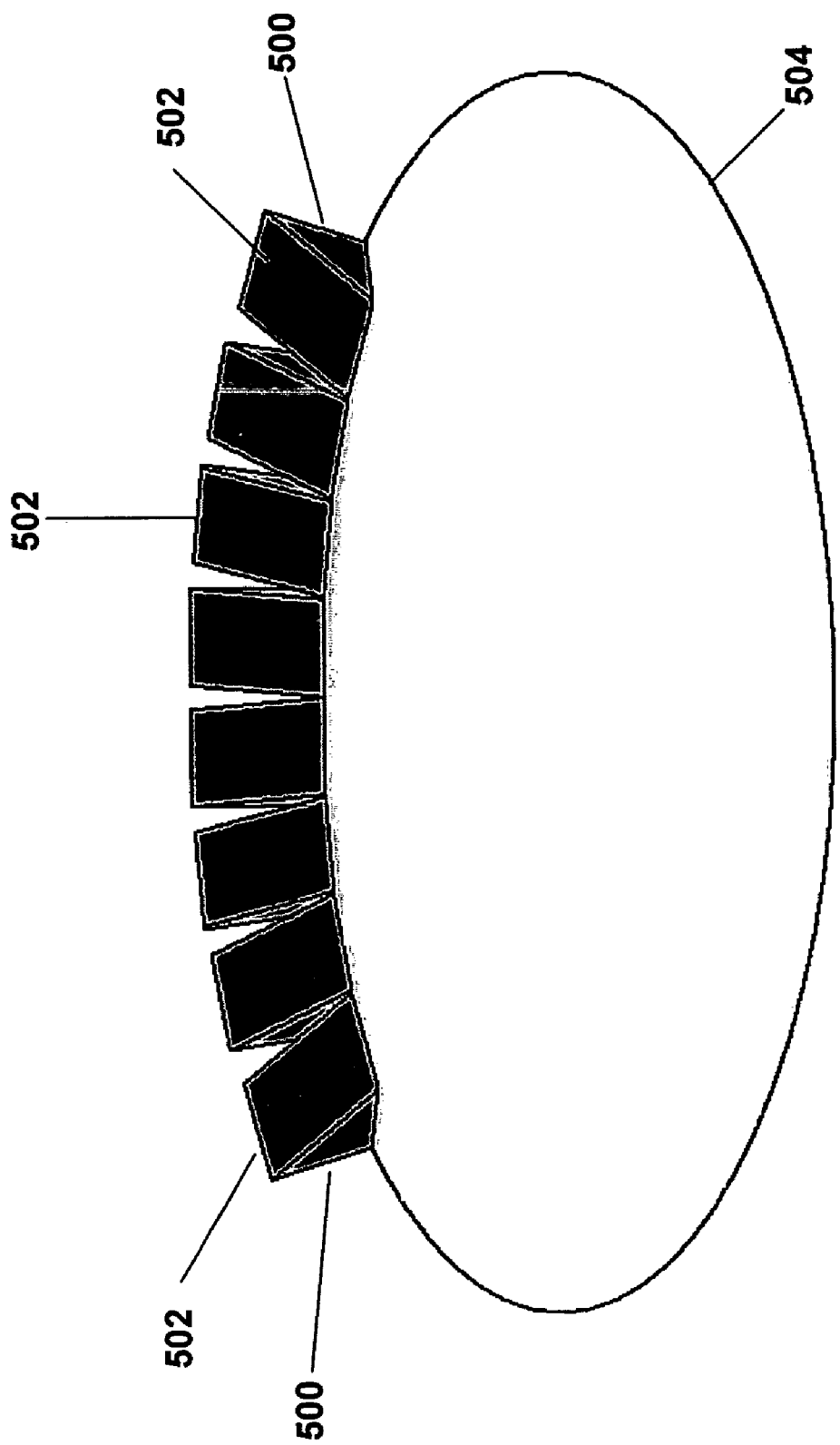
FIG. 7 illustrates a multi-image lens having a plurality of individual prisms arranged around a circle.

In the case of the multi-image lens, prisms are used to provide a controllable field of view. In this case, the individual facets are isolated from each other optically, and the resultant images are viewed separately or "photostitched" together. In the multi-image lens configuration shown in FIGS. 1a, 3, and 4, a test screen was placed 10 cm away from the multi-image lens, with the real world distance between the furthest right and furthest left points as 11 cm. By simple geometry, the field of view of the multi-image lens is $$2 \times \arctan\left(\frac{11 \text{ cm}/2}{10 \text{ cm}}\right),$$

or 57.6°. While this is comparable to the field of view of typical endoscopes (30°-40° field of view), it is important to recognize that this apparatus is not optimized for field of view. Indeed, the outer facet surfaces 500 of a complete circle of prisms 502 (or a unitary multi-image lens of similar geometry) can just as easily be oriented at right angles as is shown in FIG. 7, resulting in a complete 180° field of view. For simplicity, only a portion of such prisms 502 are shown in FIG. 7, however, it is assumed that the prisms 502 are arranged completely around a circle 504. There are certain "extreme wide angle" endoscopes as well, but these use parabolic lenses that result in image distortion. Also of note is that increasing the field of view comes at the expense of overlapping fields of view of the facets of the prisms. This becomes an issue when trying to recover the three-dimensional information.

With regard to directionality, a single viewing means can provide streaming video that allows for panning in both the horizontal and vertical directions. This is accomplished by photostitching the individual facet images together (for example using Canon® Utilities PhotoStitch version 3.1.7.19). The viewing means then provides parts of the composite image that correspond to the desired direction of view. When used practically, only a single viewer can be used with moving video within it.

While the theoretical development discussed above showed that three-dimensional information is indeed retained by the images captured by the multi-image lens, there are a number of variables that complicate a strictly computational analysis of the pictures. The inherent magnification in the camera, size and distance from the objective lens of the CCD image capture device, and internal processing mechanism of the digital camera are all unknown. Instead of building a system from the bottom-up to strict specifications, it is more cost effective to use a modified commercially available system and calibrate the analysis accordingly. This is especially true given that the bottom-up approach may require calibration anyway.

Figure 8A:
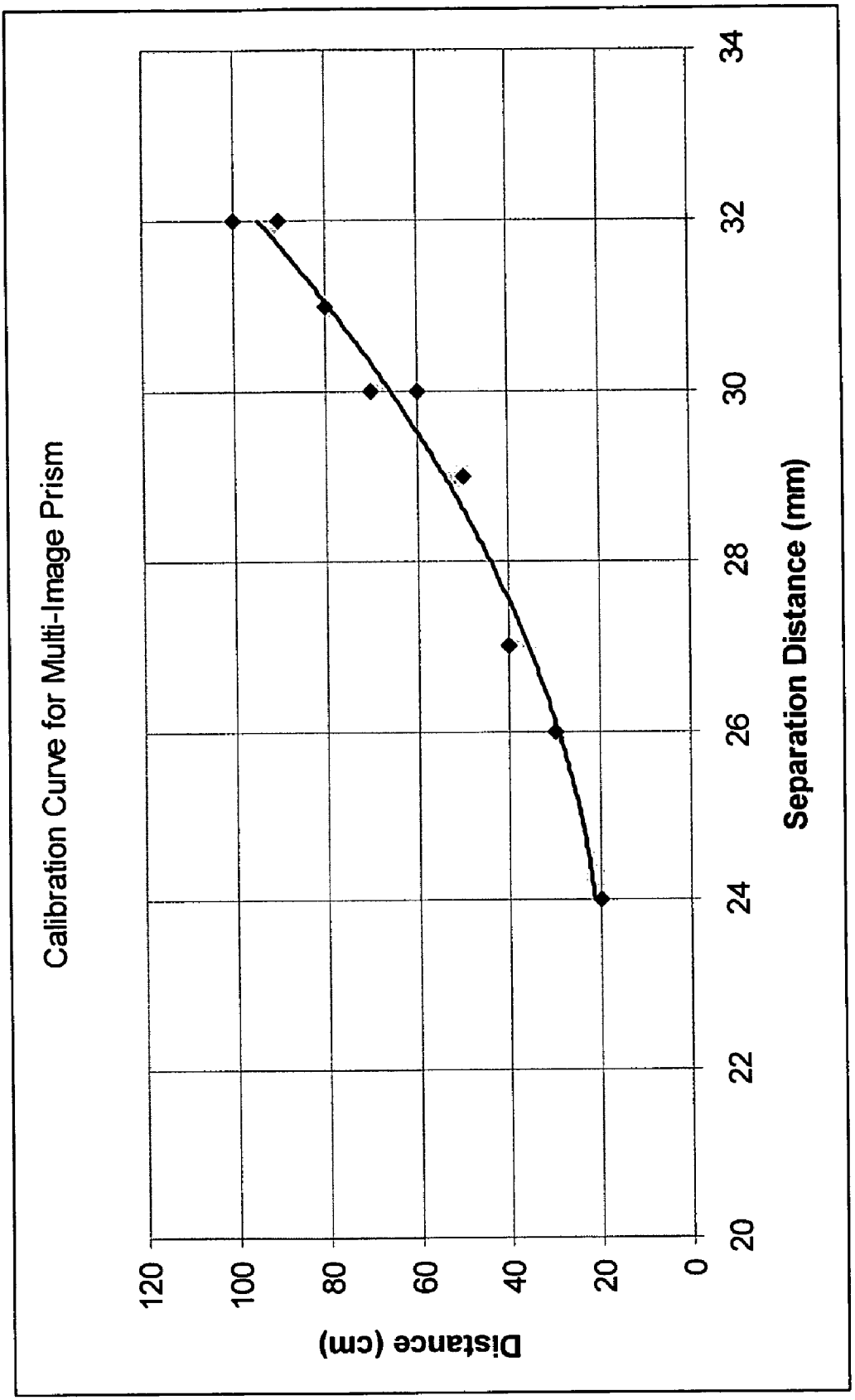
FIGS. 8a and 8b demonstrate an example of the calibration of the multi-image lens system of FIG. 4.

In this case, calibration is performed by taking images of an object or objects at prescribed distances from the camera. This is the same procedure used in the pinhole camera and lens film camera proof-of-concepts. FIG. 8a shows the calibration curve of objects from 20 to 100 centimeters from the camera 204, by increments of one centimeter in the system of FIG. 4. The displacement between each of the corresponding points is shown varying with distance from the camera 204. The distances are chosen from the center facet 102e outward, to ensure symmetry in each of the four directions, as shown in FIG. 8b.

Figure 8B:

Also, the field of view of the multi-image lens as seen in FIG. 8b is clearly larger than the field of view of the digital camera itself. This results in a cropped image. Therefore, using the center facet 102e as a reference removes the ambiguity of trying to determine the outer boundary of the exterior facets 102a-102d. However, changing the chosen separation distance also alters the shape and direction of the curve from that of the proof-of-concept standard curves. However, these separation distance values are still unique to the distance to objects in a scene, and can be used in the same way.

The next step is to take an arbitrary image, and apply the calibration curve to obtain a depth map. The separation distances between corresponding points is compared to those predicted by the standard curve.

Figure 9:
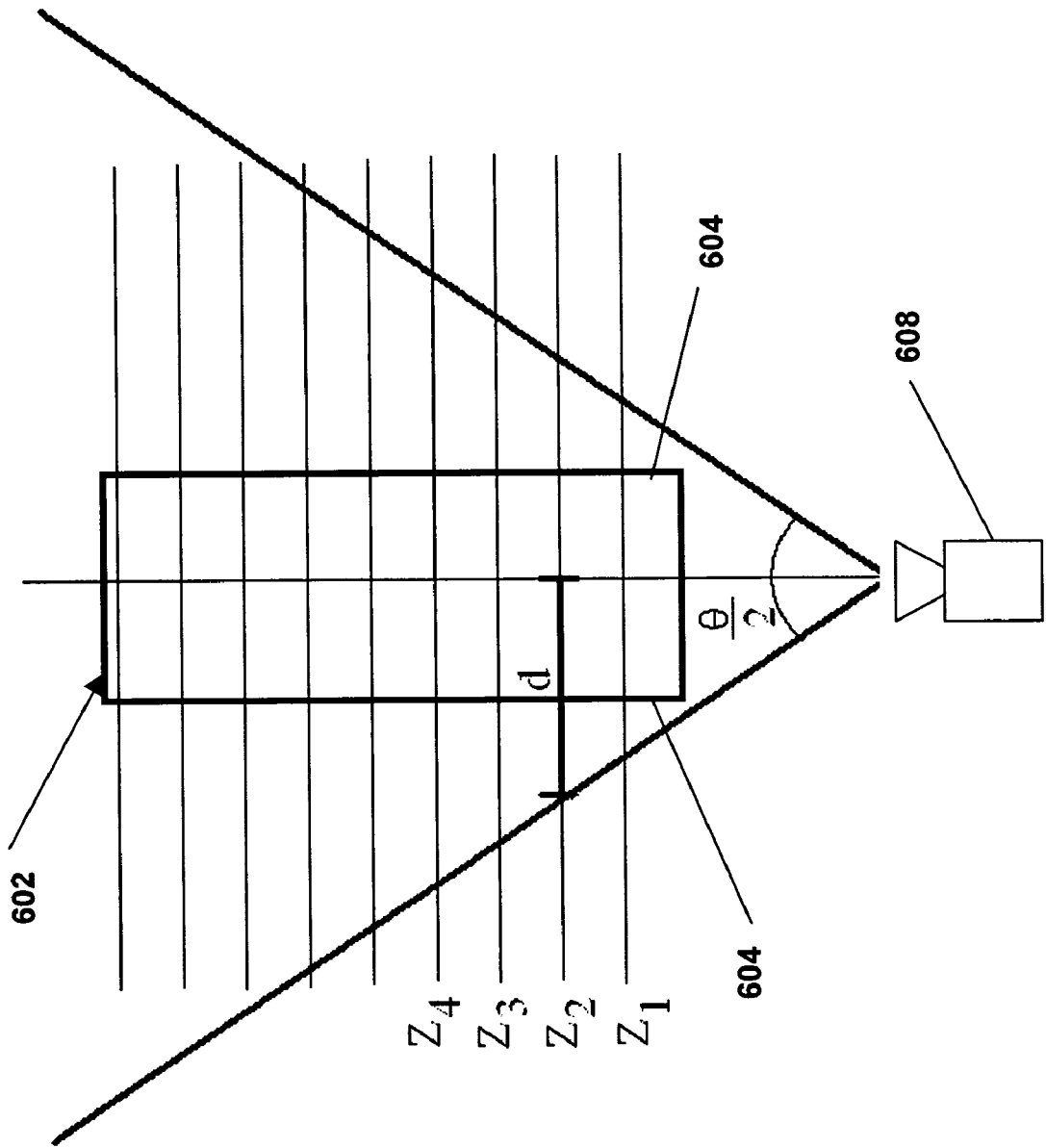
FIG. 9 illustrates a top view schematic of the a two-dimensional field of view of a camera with a rectangular object within the field of view.

FIG. 9 shows the field of view of a camera 600 with a rectangular object 602 in the scene. Typically, cameras have a field of view in the shape of a volumetric cone. In two-dimensions, the sides 604 of the rectangular object 602 converge and the real world coordinate information is lost. That is, there is no clear correlation between the distance between two points and the corresponding real world distance. However, if a depth map is obtained for all points in a scene, then real-world measurements are possible.

It was determined that the field of view of the entire multi-image lens was 28.8°. By the same methodology, we determine the field of view of the central facet only. Using the image in FIG. 8b, which is 20 cm away, the distance between the furthest left and right points is 78 mm (real-world value). The field of view of the central facet is then $$2 \times \arctan\left(\frac{78 \text{ mm}/2}{200 \text{ mm}}\right) = 22°.$$

Knowing the angle θ and the distance z from the camera point to the object allows for a simple calculation of distance. That is, the total width of the field of view at that distance z can be determined, and the appropriate distances can be calculated by using proportions of the total field of view.

It is understood that the results obtained from large-scale models may differ significantly from a miniaturized device. From the equations presented above and the experimental results, it is expected that the accuracy will improve due to the increased separation distance (and hence lower error ratio) at smaller distances.

Figure 10B:
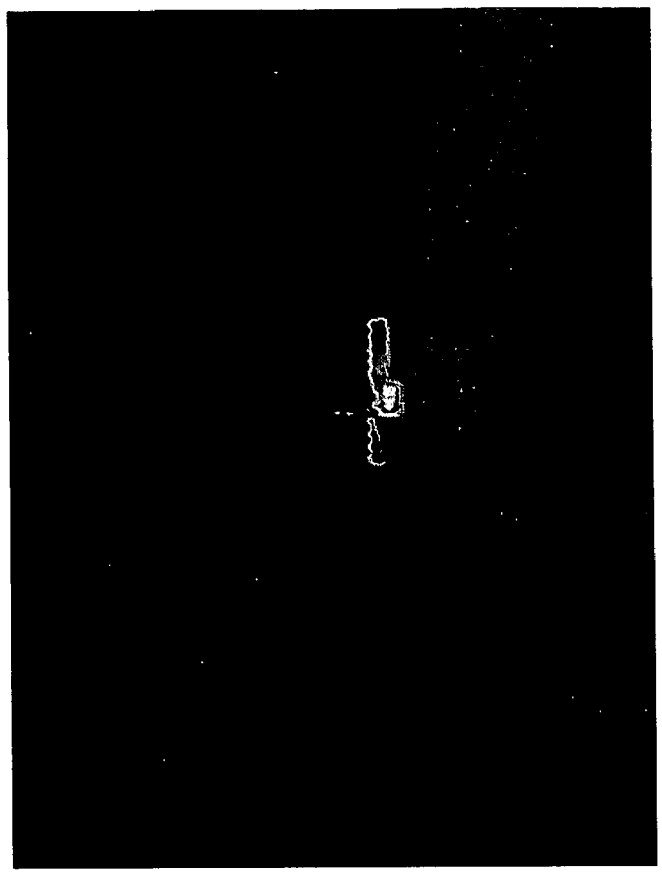
FIGS. 10a and 10b illustrate images of a sample structure from a multi-image lens apparatus under visible light and infrared light, respectively.
Figure 10A:
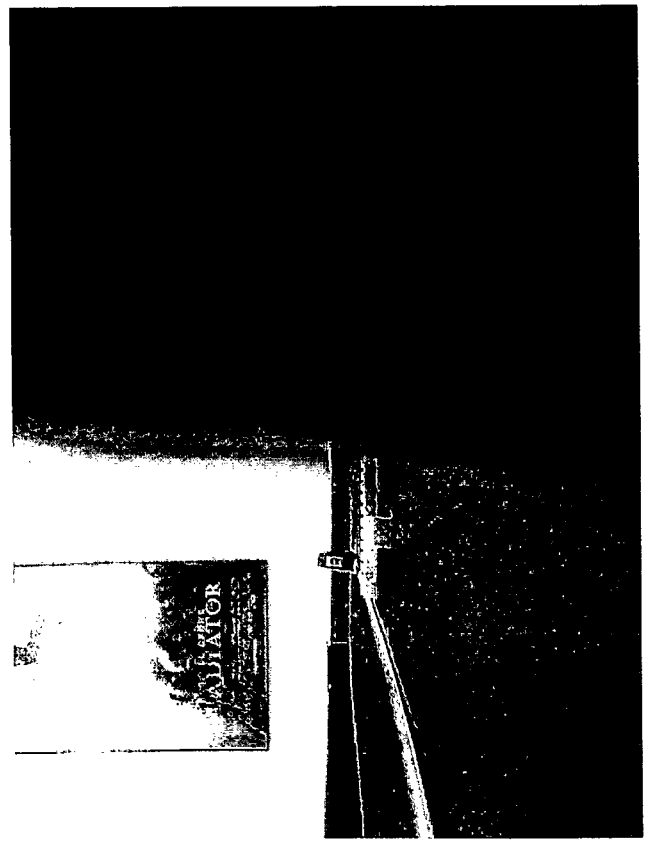
Figure 11:
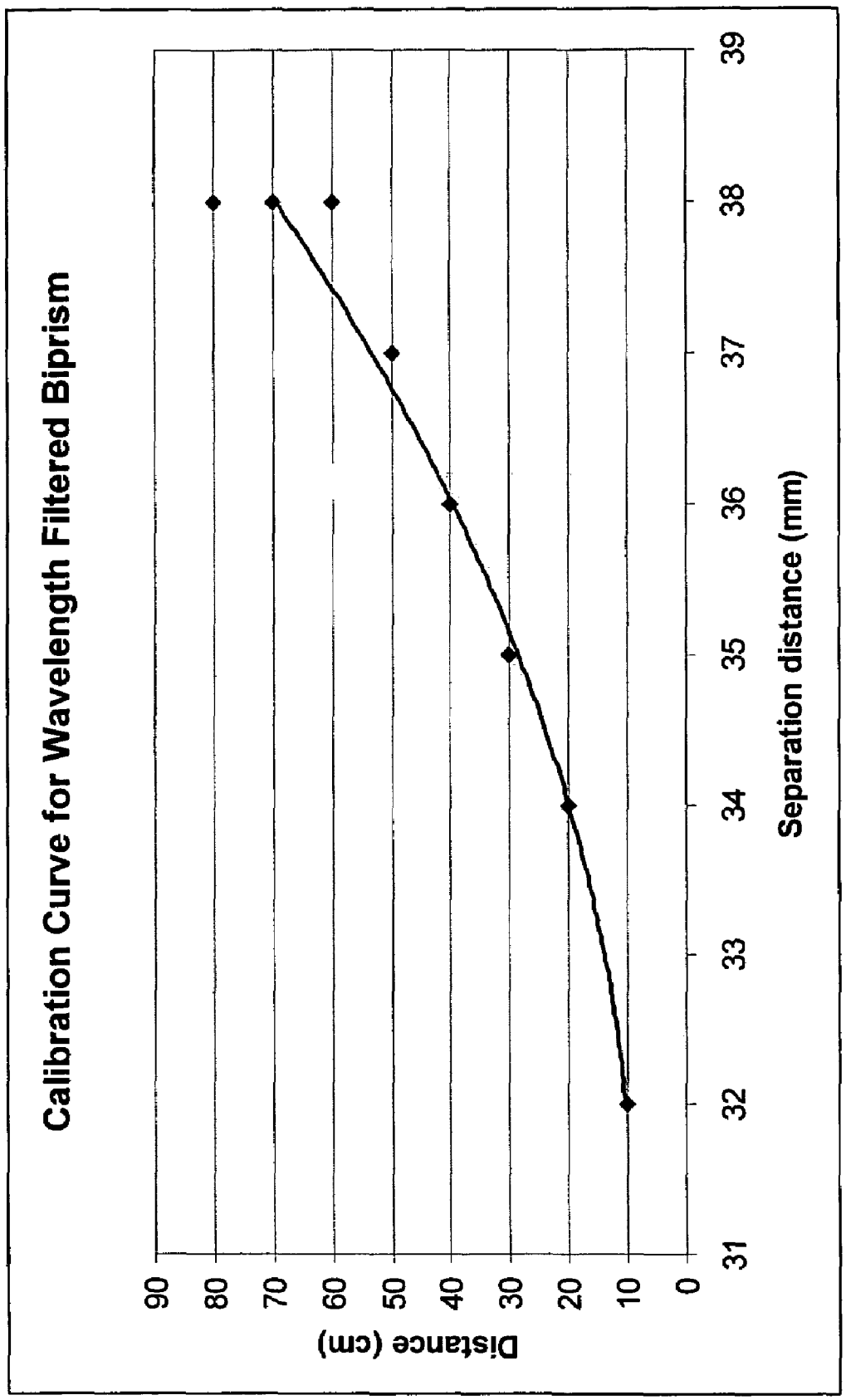
FIG. 11 illustrates a graph of a calibration curve for a wavelength filtered multi-image lens apparatus in which the multi-image lens is a biprism.
Figure 12B:
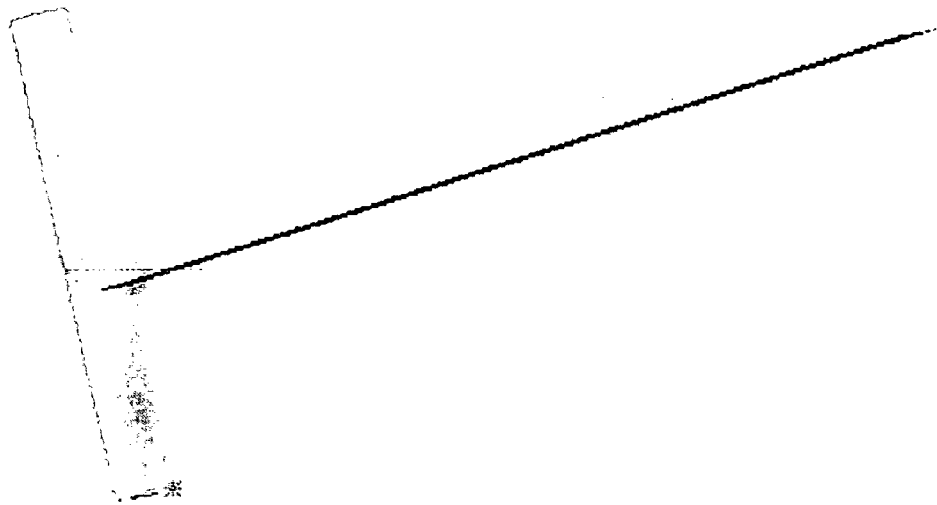
FIGS. 12a and 12b illustrate computer-generated reconstructions of the images of FIG. 11 using a multi-image lens apparatus of the present invention, in which the multi-image lens is a biprism.
Figure 12A:
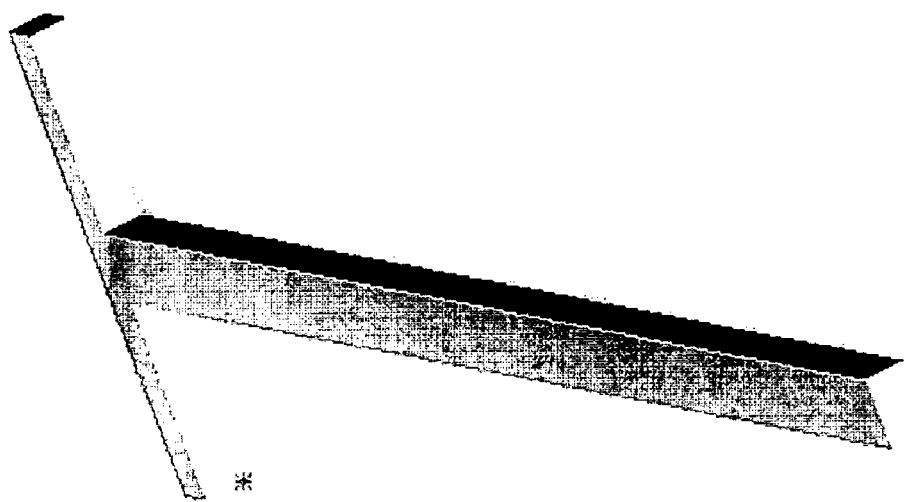

Referring now to FIGS. 10a and 10b, a biprism multi-image lens system is used with wavelength filters acting as the means 302. The resulting images shown in FIGS. 10a and 10b are of a sample structure under visible light and illumination under infrared light. A calibration curve was generated as discussed above. That is, biprism images were taken at prescribed values of distance, and the separation distances of corresponding points were determined for each distance. This curve is given in FIG. 11. Then, a new structure was photographed and a depth map was created. From this depth map, a computer generated simulated structure was generated and is shown in FIGS. 12a and 12b.

In some instances it may be necessary to have a camera in a very space-restricted area. For this purpose, a method of producing a smaller device (micron to millimeter scale) is also provided. For applications where size is heavily restricted, it may be desirable to have a smaller device. To produce such a device economically, one method of fabrication is to use currently available microfabrication techniques. While it is possible to use traditional machining techniques for the formation of prisms, these methods have a dimensional lower limit in the millimeter range. Micromachining processes have dimensional constraints in the micron range. Currently, micromachining has not yet been applied to the field of biomedical optics. In particular, the manufacturing process described herein relies on recent technological advances involving polymer micromachining.

The field of polymer micromachining has received increased attention recently, in large part due to ease of processing, biocompatibility, and material properties. Polymers themselves can be used as molds, structural materials, and optical devices. Their material properties lend themselves more readily to true three-dimensional fabrication, whereas traditional silicon processes use two-dimensional techniques to form three-dimensional structures. Also unlike silicon, polymers are flexible and not subject to brittle fracture. This provides benefits in ease of packaging as well.

There are a number of fabrication techniques under development by research groups worldwide. These include self-assembly through electrostatic forces and functional groups, microstereolithography, and micromolding. Self-assembly involves altering a polymer backbone such that natural forces produce the desired final object. Microstereolithography creates three-dimensional shapes by the interaction of a laser with a photocurable liquid resin. This is a layer-by-layer maskless process. Micromolding involves injection of liquid polymers just as in traditional molding, but with much lower tolerances.

In addition to the fabrication method, there are a multitude of polymer materials being experimented with as well. SU-8 is an example of an epoxy resin that has been utilized for its cross-linking properties when exposed to light. Cross-linked SU-8 is resistant to specific solvents, whereas non-cross-linked SU-8 remains susceptible. This allows for patterns to be etched into SU-8 photolithographically. Polydimethylsiloxane (PDMS) is a liquid polymer that cures to a solid over time, and is extremely cost-effective. UV-curable polymers are similarly cast as liquids, but harden in response to ultraviolet light.

The main considerations are ease of processing and cost-effectiveness. The methods used were chosen based on their availability and relative simplicity, and are limited in their requirements of specialized equipment.

There are three main parameters that dictate the ability of a prism to properly refract an image. These are wedge angle, smoothness of the slope, and the sharpness of the edges. The wedge angle is given by design, but the smoothness and edge sharpness is a function of processing. In general, the edge sharpness is described as having a radius of curvature within which light is directed inappropriately.

The amount of inappropriately directed light is inversely proportional to the level of miniaturization of the prism. Mathematically, the efficiency (n) of a prism can be described as:

$$n = 1 - \frac{A}{A_0} \quad (39)$$

where $$\frac{A}{A_0}$$

is the fraction of light which undergoes deflection in the wrong direction. This ratio is proportional to radius of curvature of the edge ($r_c$) and inversely proportional to the baseline size of the prism ($\Delta x$). If we consider the scaling of a prism, then this ratio is inversely proportional to $\Delta x \cdot M$, where M is the scaling factor. Written in equation form:

$$\frac{A}{A_0} \propto = \frac{1}{M} \cdot \frac{r_c}{\Delta x} \quad (40)$$

In addition, when the aperture of a prism decreases, its point-spread function becomes increasingly dependent on the diffraction limit. At the point where the image is diffraction-limited, aberrations no longer play a role in the performance of the prism.

The material properties of PDMS itself also play a role in the prism performance. The relevant optical parameters of PDMS include uniformity of refractive index (n≈1.4), aberrations due to shape deformation or internal stresses, internal and external transmittances, and surface reflectance.

The apparatus of the present invention have applications in a variety of fields. For security or surveillance cameras, it allows for omnidirectional vision silently, without moving parts, and in small spaces. Switching between a viewpoint occurs much faster than a moving camera, yet is much more cost effective than having multiple cameras.

In the medical field, it is particularly appropriate, given the small incisions of laparoscopic surgery and the like. Implementation of the apparatus and methods of the present invention to an endoscope would enable physicians to have unprecedented control over their viewing angles. The following examples are from the medical field. The applications described below include endoscopy, angioscopy (specialized form of endoscopy), stereoendoscopy, and optical coherence tomography.

In particular, fiber optic technology has allowed for the direct visualization of the gastrointestinal tract, bronchial system, and vasculature. Unfortunately, there are several drawbacks to existing fiberscopes. First, their field of view is inefficiently guided; that is, they rely on the manual rotation of a bent fiber optic end tip to provide a cylindrical view about a point. Secondly, as the fiber optic approaches an internal structure, the structure appears larger. As such, it is very difficult to discern the actual size of an object projected onto a computer screen. Finally, the images from a single input are necessarily only two-dimensional, making the interface less intuitive for the physician.

In recent years, many diagnostic and therapeutic procedures have been phased out in favor of minimally invasive methods. Indeed, by working through small incisions (typically less than 10 mm) and the natural orifices of the human anatomy, physicians are able to reduce patient trauma, decrease procedure time, and accelerate recovery. However, these benefits are gained at the expense of added procedural difficulty for the medical practitioner.

While fiberscopes have proved to be invaluable in many procedures, there are certain situations where their limitations have precluded their use. A key example of this is angioscopy, the internal viewing of arteries and veins. Suffice to say, the improvement of fiberscopes is a continuing interest in both the commercial and academic worlds.

There have been numerous attempts in the prior art to create a stereoendoscope, with varying degrees of success. Examples include a dual video camera arrangement, a prism arrangement, alternating pupil design, and head-mounted displays. These have been used in a number of fields, including three-dimensional gastrointestinal endoscopy, neuroendoscopy, and laparoscopy. Particularly promising are those that have reported performance improvement from surgeons using stereoscopic perception.

While not directly related, computed depth perception would provide an added capability to the stereoendoscope. The determination of object coordinates from two-dimensional images has been studied in computer vision systems, topographic photogrammetry, and laser projection 3D modeling. The common underlying concept is that, given two cameras a known distance apart, it is possible to calculate the distance to an object present in both image fields. This has applications in endoscopy, where three-dimensional virtual images can be constructed on a computer screen, making for a more intuitive interface for the operator.

Intravascular imaging is currently used to evaluate peripheral vascular disease by providing atherosclerotic plaque and thrombi characteristics, determining the degree of stenosis in a blood vessel, and assessing graft quality. Available imaging techniques include high frequency ultrasound, angiography, and angioscopy. High frequency ultrasound (15-30 MHz) depends on detecting varying amounts of ultrasound wave reflection in tissue. Angiography involves the injection of a contrast dye to provide a "road map" of the vasculature.

Angioscopy uses a fiber optic catheter to provide an optical image.

Angioscopy remains the only imaging modality able to provide 3-D pictures in real-life colors. This has enabled physicians to better understand pathological mechanisms of atherosclerotic disease in coronary arteries, to evaluate failing vein bypass grafts, and to assess angioplasty effectiveness. Angioscopy can determine whether a vein is salvageable or should be replaced. Angioscopy can also be used to differentiate between chronically and acutely occluded vessels, delineating treatment.

With all of its applications, angioscopy remains only complementary to the other procedures. This is because there are two inherent problems with angioscopy. The first is that optical imaging requires a clear medium, and even a minute amount of red blood cells can distort the image. This has been circumvented by occluding the vessel and filling it with a saline solution. However, this limits the applicable regions of the body where angioscopy can be used. Also, the lack of blood leads to ischemia, and places a time constraint on the procedure.

The second problem is acquiring quantitative measurements. The difficulty is in determining the size and distance of a lesion. As expected, an approaching lens results in an increasingly large image, and this problem has not yet been solved commercially or without great expense. One novel solution has been to use a mathematics-based approach that relies on obtaining paired images taken a known distance apart. This method, however, assumes that the angioscope lens is located centrally within the lumen and is calibrated properly. In addition, it has yet to be proven reliable in a clinical setting.

The multi-image lens apparatus and methods disclosed herein provide the necessary information from overlapping images to calculate distances and sizes. In being able to better characterize lesions, the same can lead to an improved method of studying atherosclerotic plaques. This, in turn, can lead to the discovery of what has thus far been a highly elusive predictive factor for the rupture of such plaques. Physicians would be able to diagnose vascular disease risks and patients would be spared unnecessary procedures.

Figure 13B:
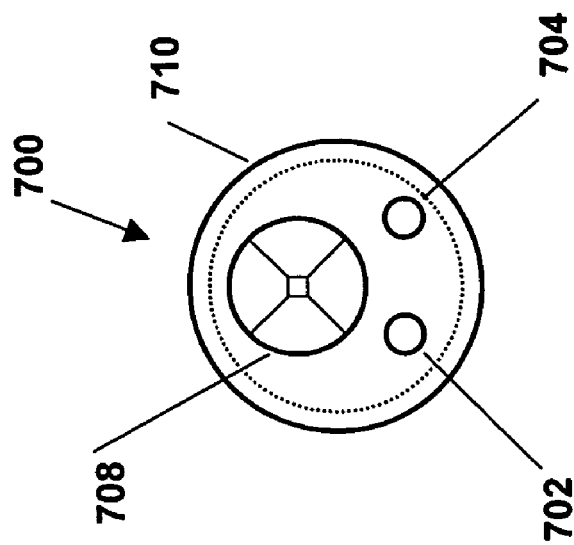
FIGS. 13a and 13b illustrate a section view and end view, respectively, of a distal end portion of an endoscope having a multi-image lens.
Figure 13A:
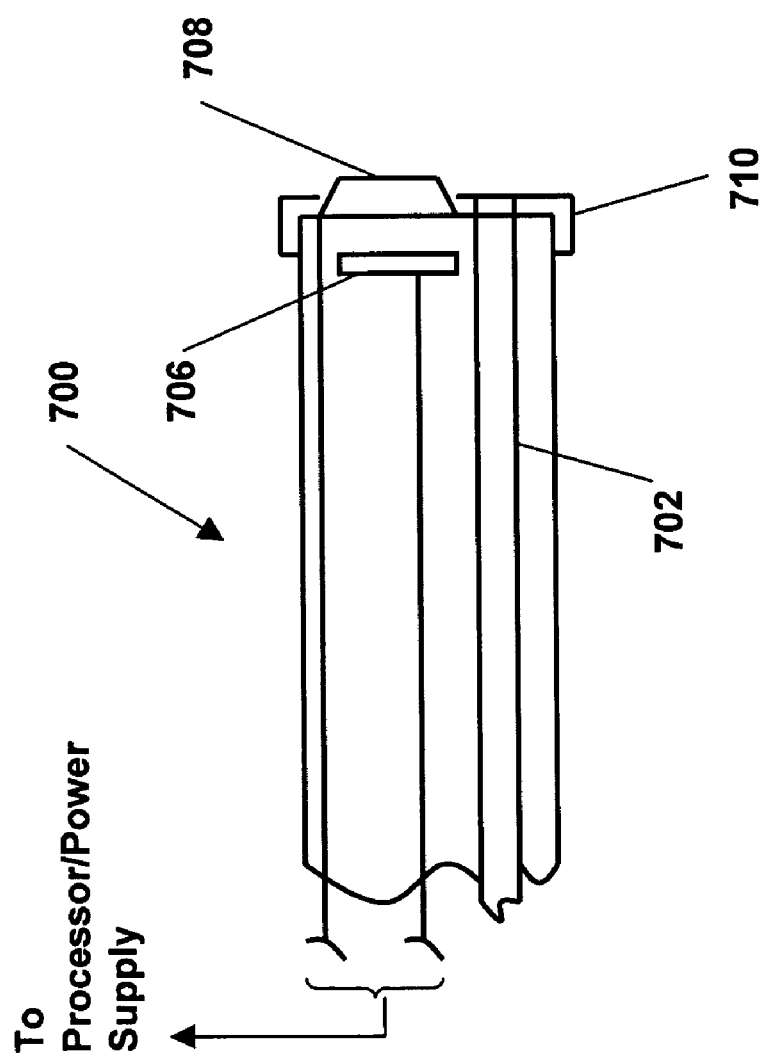

FIGS. 13a and 13b illustrate a sectional distal end of an endoscope 700 and end view thereof, respectively. The endoscope 700 can be rigid or capable of articulation, as is known in the art. The endoscope 700 typically has one or more working channels 702 for passage of an accessory instrument, such as a forceps, snare and the like and for suction or aspiration. The working channels can also be used to inject a contrast liquid or pass a guide wire. A fiber bundle 704 is also provided for providing illumination from a light source connected to the endoscope. The endoscope 700 can have a viewing eyepiece for direct observation by a user or an image capturing means 706 such as a CCD chip located near the distal end of the endoscope 702. The light source can be separate from the CCD chip, as shown, or configured as an annular ring surrounding such CCD chip, as is known in the art. The CCD is operatively connected to a processor through a suitable connector at a proximal portion of the endoscope 700. The processor is used as described above with regard to processor 304 in FIG. 4. The CCD optically communicates with a multi-image lens 708, such as that shown in FIG. 1a. Other optics, such as an objective lens for focusing an image onto the CCD chip are not shown, however, any such optics are assumed to be used where necessary and as is known in the art. A flange 710 can be used to secure the multi-image lens to the distal end surface of the endoscope 700. The flange has openings corresponding to the working channel openings and fiber bundle at the distal end surface of the endoscope. If power is needed for operation of the multi-image lens 708, such as is the case if the electochromic shutters are used, wiring can be disposed through the endoscope and electrically connected to both the shutters and a power supply. The power supply is generally connected to the endoscope 700 via a suitable connector at the proximal portion of the endoscope. The flange can be secured with adhesives, screw threads and the like. If the flange 710 is secured in a removable manner, the endoscope 700 can be operated without the flange 710 and multi-image lens 708 in a conventional manner or it can be operated with the flange 710 and multi-image lens 708 to a wider-field-of view and/or depth measurement. If power is needed at the multi-image lens, a connector can be provided at the distal end surface of the endoscope, which operatively connects to a mating connector on the removable flange 710 upon attaching the removable flange to the endoscope 700. Wavelength or other light characteristic filtering associated with the facets of the multi-image lens 708 would not require a power supply to the multi-image lens 708. However, the light source which supplies the illuminating light (or other radiation) to the optical fiber bundle (or other radiation transmission means, such as a glass rod) 704 would need to vary according to the requirements of the means 302 for isolating one of the images from each of the facets of the multi-image lens 708. The light source is generally connected to the fiber bundle 704 through a suitable connector at the proximal portion of the endoscope.

Optical coherence tomography (OCT) is a relatively new imaging technique that is one of the most promising diagnostic tools currently being investigated. What began with humble beginnings (originally designed to detect faults in fiber optic networks) has evolved into a technology that is able to non-invasively image structures 2-3 mm deep in tissue with a resolution of approximately 10 µm. The resolution of other methodologies, including magnetic resonance, computed tomography, and ultrasound is an order of magnitude higher.

The principle behind optical coherence tomography is a technique known as interferometry. Essentially, a beam of light is split into two identical beams using a Michelson interferometer. One beam is directed toward the tissue in question, while the other is sent to a moving reference mirror located a known distance away. Both beams are reflected back to a detector that measures interference, depending on the path length of the reference beam (adjusted through the motion of the reference mirror). A series of destructive and constructive interference is recorded as an interferogram, which is interpreted to determine the object distance.

An added benefit is that the 'interrogation' beam is able to reach several depths, and a new interferogram is formed for each reflective surface. Thus, optical coherence tomography allows for method of composition determination in an inhomogeneous sample. This analysis is performed for each point of an area scanned by the interrogation beam, providing information in three dimensions.

While originally used for studying transparent structures, such as the eye, recent interest has emerged for applications in endoscopic and vascular imaging. OCT use in angioscopy is particularly appropriate because, in the commonly used wavelength range (800 nm-1500 nm), blood is transparent. There is, however, still a need for a scanning mechanism to direct the interrogation beam.

In the case of fiberscopic imaging, this need has the added restriction of limited space. Mechanical rotating devices require gears and moving parts, but they suffer from fatigue and breakage particularly at the small scale required. Therefore, current OCT arrangements involve a system only slightly improved over the manual rotation used with endoscopes. Instead, a motor at the proximal end of the catheter rotates a bent fiber optic tip at a linear rate.

The multi-image lens apparatus and methods of the present invention offers the same advantages to optical coherence tomography as it does to fiberscopic imaging. Specifically, it enables a method of directing the interrogation beam of light precisely and without moving parts. This should improve both the performance and efficiency of current OCT systems.

When used on a small scale, a necessary component of the multi-image lens apparatus of the present invention is a micro fabricated array of prisms. While there are wide ranges of options for fabricating microscale refractive lenses, the situation with prisms is quite different. To begin with, lenses are predominantly spherically or radially symmetrical, and thus are well suited to formation by natural forces such as surface tension, isotropic diffusion, or isotropic etching. Methods for the manufacturing of microprisms are decidedly more limited. Because edge sharpness, flatness, and aspect ratios determine the quality of the refracted image, quality microprisms have proven to be much more expensive to produce.

The first step in designing the micro fabricated lens is material selection. For the multi-image lens apparatus of the present invention, some considerations include biocompatibility, formability, optical properties, and expense. Some available options include spin-on glass, PDMS, SU-8, and UV-curable polymers. Among these, PDMS provides the best combination of rapid prototyping and availability. As previously mentioned, it is also biocompatible, and is being investigated as a possible material for contact lenses. While the device is not meant to be left in contact with tissues for large amounts of time, this property will avoid potential complications that can occur acutely.

Due to the versatile nature of PDMS, there are many appropriate ways to make a mold. In order to make a multi-image lens configuration, the conventional approach would be to machine an identical structure first out of a material such as aluminum or Teflon. This structure can then be imprinted into PDMS (or other material), which is used as the final mold. This is certainly a feasible process, although micromachining has certain advantages over the conventional approach.

In micromachining, a well of the appropriate shape can be manufactured directly, making prism fabrication a two-step process rather than a three-step one. In addition, the surface roughness which results from the conventional approach may adversely affect the image quality obtainable through a prism. Solvent etching techniques, prevalent in micromachining, also result in some degree of surface roughness, although to a lesser degree. For a prism design, only a very simple photolithographic mask is required, and prisms can be efficiently batch fabricated with ease.

In one example of fabrication, a silicon mold is created for the PDMS. In order to produce a three dimensional well with sloped sidewalls, we take advantage of the crystallographic nature of silicon. Pure silicon exists in a diamond lattice configuration, with $sp^3$ tetrahedral bonding.

While much of the silicon in nature is impure and amorphous, semiconductor manufacturers produce silicon in its pure crystallographic form by way of what is known as the Czochralski process. In this process, a seed crystal is dipped into a crucible of molten silicon and pulled out slowly. The temperatures, ambient gasses, rate of pulling, and rate of rotation are carefully controlled to produce a single crystal. This crystal is then sliced according to the crystallographic planes.

The planes themselves are important, and are described by using Miller indices. Miller indices are obtained by taking the reciprocals of the x, y, and z intercepts of a plane, clearing the fractions, and reducing them to the lowest terms. As a result of the crystallographic structure of silicon, etching by solvent solution can be highly anisotropic. That is, some directions are more susceptible to the etchant than others.

In particular, etching a 100-plane wafer with a highly basic KOH solution (commonly used due to its relative safety) reveals the 111-plane, which forms a 54.7° angle. This angle can be controlled somewhat by varying the time of exposure, etchant used, and temperature. Therefore to make the mold, all that is required is an exposed predefined square area that is subject to a KOH etch. This will result in a well with angled sidewalls at 54.7°.

The process flow for generation of the mold is described generally by:

1) Spin-on negative photoresist (SU-8) onto a 100-plane wafer
2) Expose with a mask transparent through a 1 mm×1 mm square opening
3) Develop photoresist
4) Etch using KOH (250 g)+deionized water (1000 mL) for 5 minutes at 80° C.
5) Dissolve photoresist To produce the prism, liquid PDMS is prepared and used to coat the mold. It is left to cure for 2 days, and gently peeled from the mold. The result is a PDMS multi-image lens. Over a single wafer, hundreds of molds can be made simultaneously, resulting in batch fabricated multi-image lenses. The refractive properties, surface roughness, and edge sharpness of the PDMS prisms are defined by the etching of the mold.

Figure 14B:
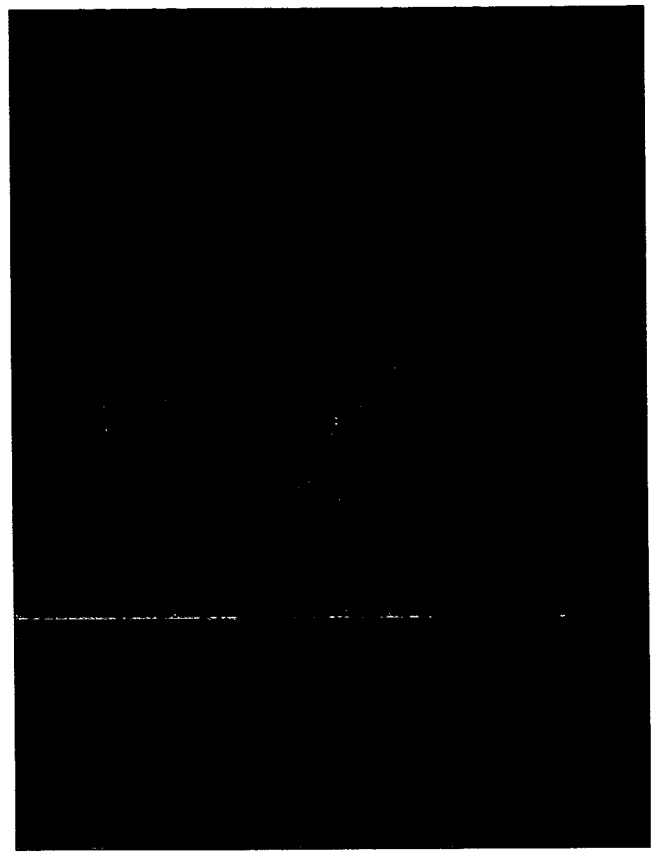
FIGS. 14a and 14b illustrate a mold and micro-multi-image lens fabricated from such mold, respectively.
Figure 14A:
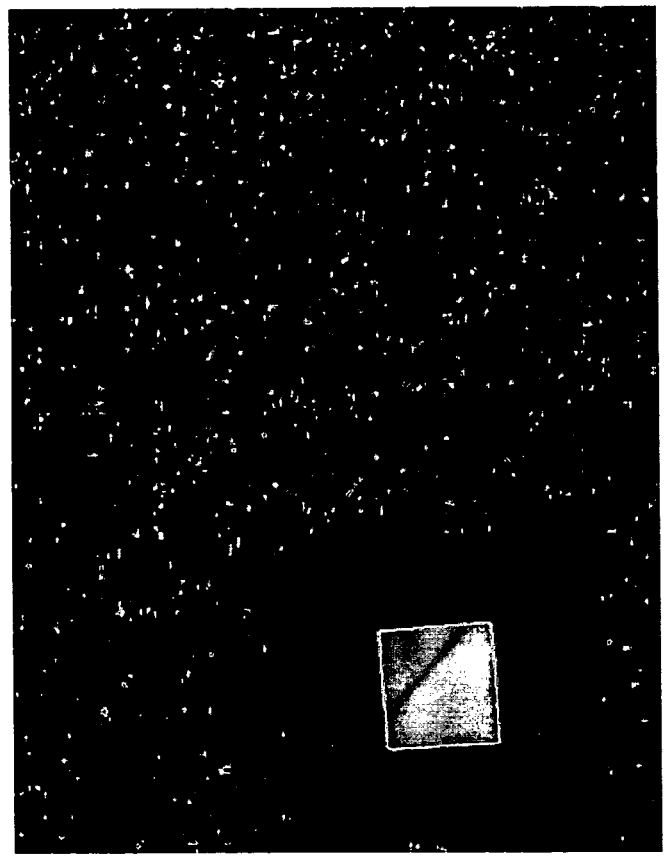

An example of the micromachined PDMS multi-image lens mold and resulting lens are shown in FIGS. 14a and 14b, respectively. The multi-image lens is optically clear, with an index of refraction of 1.4. In order to determine the deviation of optical axes between each of the faces of the multi-image lens, a laser testing apparatus was used. This consisted of directing a laser source through the multi-image lens of FIG. 14b onto a projection screen. When the laser is unmodified, corresponding points are displayed on the projection screen. When the laser is subject to a magnifying collimator, the shape of the facets are reflected individually.

Figure 15:
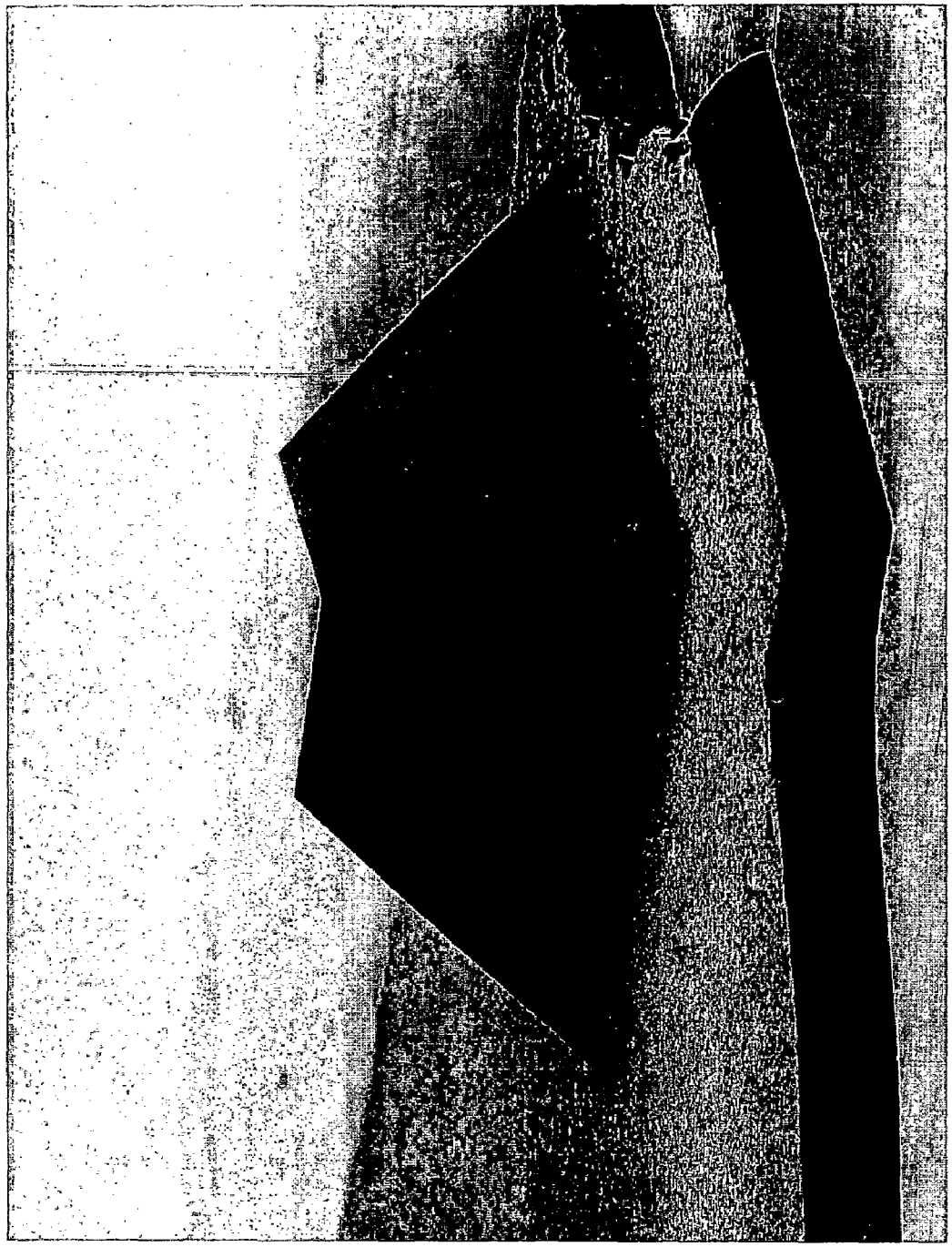
FIG. 15 illustrates a magnified view of the micro-multi-image lens of FIG. 14b.

To examine the surface roughness of the PDMS multi-image lens of FIG. 14b, a scanning electron microscope was used. As can be seen in FIG. 15, the surface of the multi-image lens is very smooth and suitable for imaging applications.

Figure 16:
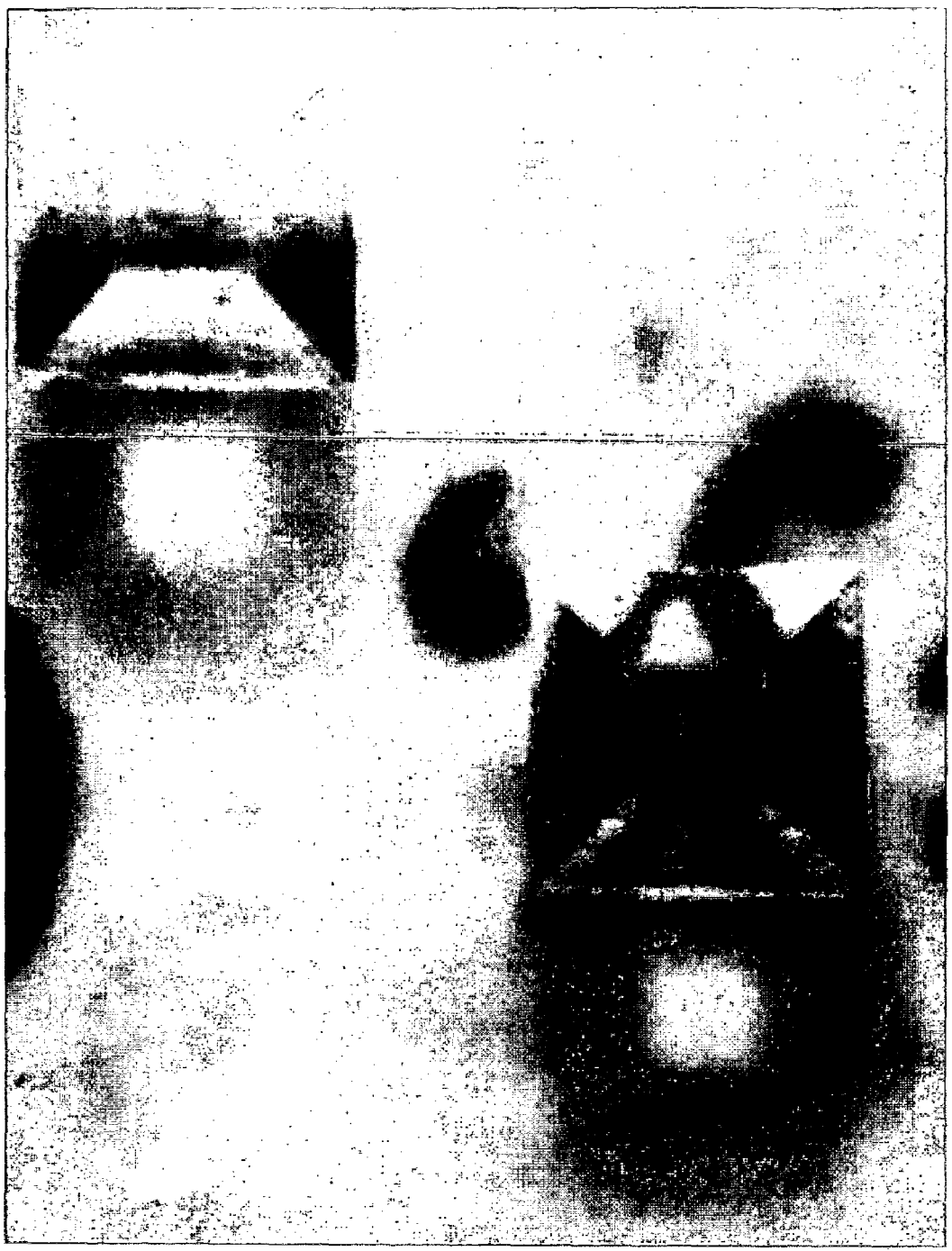
FIG. 16 illustrates a micro-multi-image lens on a substrate having a test indication thereon.

To test the imaging properties of the multi-image lens, it was placed on the objective lens of a microscope. A test pattern was placed beneath it that, in the case of FIG. 16, was the letter y. It is apparent that segments of the y overlap in the different facets of the multi-image lens. Therefore, the multi-image lens will be useful in obtaining a wider field of view image and the depth mapping method described earlier can be applied to the resulting images.

Figure 17A:
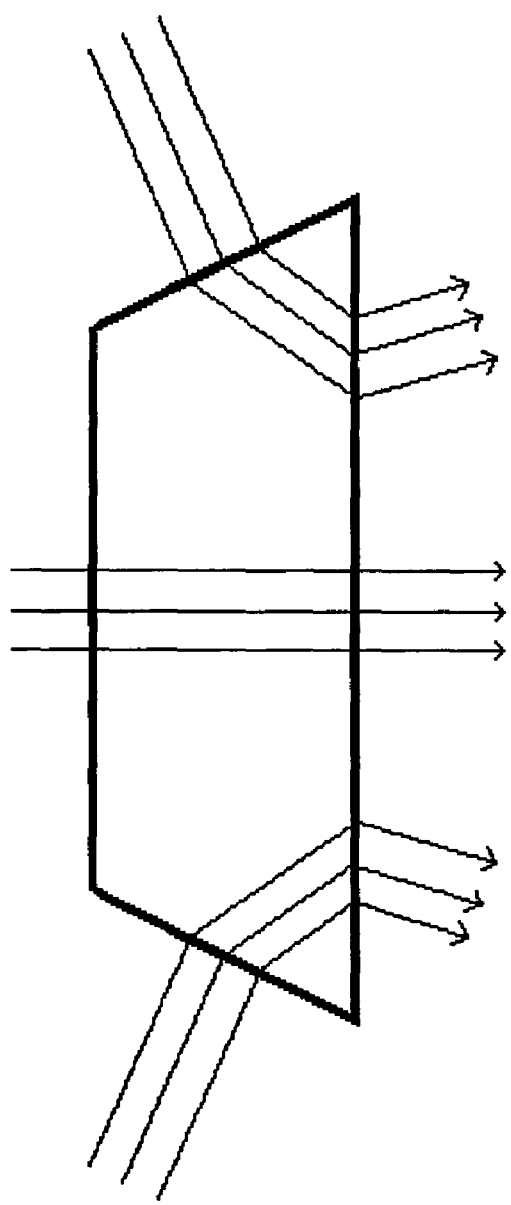
FIGS. 17a and 17b illustrate the effect of sidewall angles and material properties on multi-image lenses.
Figure 17B:
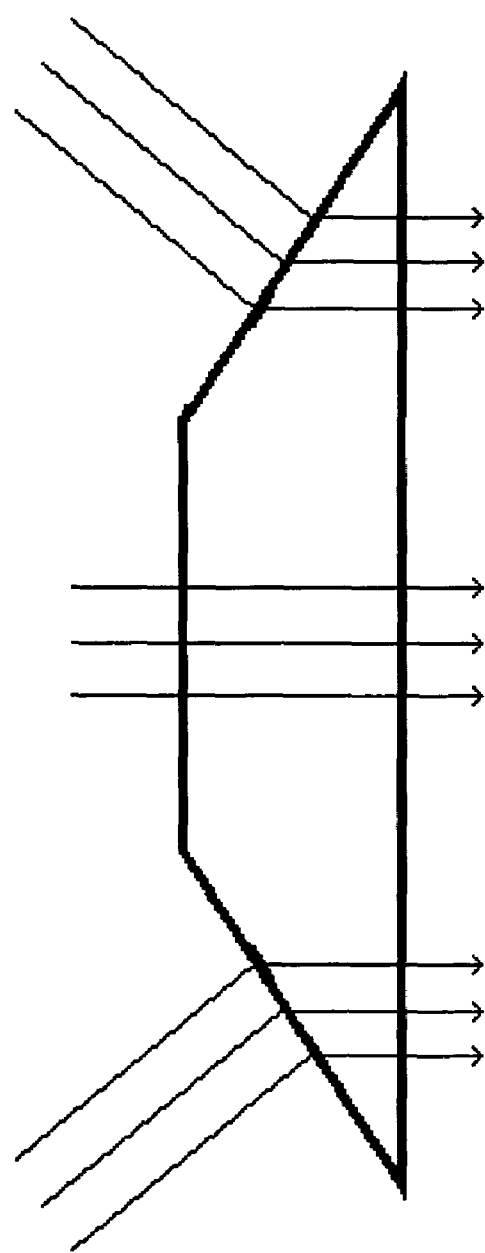

It should be noted that each of these images were taken with the flat side of the multi-image lens facing externally. That is, the multi-image lens was inverted. This is because the angle between the (100) and (111) planes of 54.7° is not ideal for a material such as PDMS, which has an index of refraction of 1.4. If the prism were directed such that the angular faces pointed outward, the light rays are refracted at two interfaces. This complicates both the image and the analysis by causing the light rays to deviate from normal to the camera, as is illustrated in comparing FIGS. 17a and 17b.

In order to remedy this, it is necessary to either use a material of different refractive index (or modify the refractive index of PDMS) or change the angle of the mold. Because of the availability and ease of processing of PDMS, the latter option was used as yet another example. The recipe for the mold is the same, except for the addition of isopropyl alcohol (IPA, 300 mL) to the etchant solution to produce a desired 45° sidewall.

Despite the tighter tolerances required for miniature prisms to effectively refract images, it has been demonstrated that micromachining is an appropriate manufacturing technique. For this project, PDMS prisms have been fabricated with low surface roughness by using standard KOH etched silicon molds. These prisms have the appropriate deviations in optical axes and have the capability to refract images. However, the natural angles produced by the crystallographic planes of silicon are not ideally suited for the optical properties of the prism material. A simple modification of the existing method is able to produce the desired angles of the mold. However, this process must be optimized to produce adequate well depths.

Recently, great advances have been made in "growing" natural crystals, such as diamonds. Such diamonds, are not synthetic but exhibit all of the characteristics of diamonds formed in nature. Such methods hold promise for fabrication of the multi-image lenses used in the apparatus and methods of the present invention.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An apparatus for imaging objects, the apparatus comprising:
    a multi-image lens having two or more facets, each facet imaging the objects along a different optical axis;
    an image capturing means in optical communication with the different optical axes for capturing the imaged objects from each of the two or more facets; and
    means for sequentially isolating one of the images from each of the two or more facets of the multi-image lens, such that only the isolated image is incident upon the image capturing means;
    wherein the means for sequentially isolating one of the images from each of the two or more facets of the multi-image lens comprises:
    an electrochromic shutter associated with each of the two or more facets; and
    a processor for sequentially closing all but one of the electrochromic shutters.

2. The apparatus of claim 1, wherein the multi-image lens is a biprism having two facets on one side thereof.

3. The apparatus of claim 1, wherein the multi-image lens has five facets on one side thereof.

4. The apparatus of claim 1, wherein the image capturing means is a charged coupled device (CCD).

5. The apparatus of claim 1, further comprising a processor for processing each of the isolated images to construct a video image of the objects.

6. The apparatus of claim 1, further comprising a processor for processing each of the isolated images to determine depth measurements for the objects.

7. The apparatus of claim 6, wherein the processor further generates a three-dimensional rendering of the objects from the determined depth measurements.

8. The apparatus of claim 1, wherein the multi-image lens is a unitary lens.

9. The apparatus of claim 1, wherein the multi-image lens comprises a plurality of lens.

10. A method for imaging objects, the method comprising:
    imaging the objects along at least two different optical axes;
    sequentially isolating images of the objects from each of the optical axes; and
    capturing each of the isolated images of the objects;
    wherein the sequentially isolating images from each of the optical axes comprises:
    providing an electrochromic shutter associated with each of the optical axes; and
    sequentially closing all but one of the electrochromic shutters.

11. The method of claim 10, further comprising processing each of the isolated images to construct a wide field of view image of the objects.

12. The method of claim 10, further comprising processing each of the isolated images to construct a video image of the objects.

13. The method of claim 10, further comprising processing each of the isolated images to determine depth measurements for the objects.

14. The method of claim 13, wherein the processing further generates a three-dimensional rendering of the objects from the determined depth measurements.

15. An apparatus for imaging a scene, the apparatus comprising:
    a charged coupled device (CCD) in optical communication with the scene along an optical path;
    a multi-image lens disposed in the optical path, the multi-image lens having two or more facets, each facet transmitting an image of the scene to the CCD; and
    a device which isolates one of the images from each of the two or more facets, such that only the isolated image is incident upon the image capturing means at any instant;
    wherein the device comprises:
    an electrochromic shutter associated with each of the two or more facets; and
    a processor for sequentially closing all but one of the electrochromic shutters.

16. An endoscope comprising:
    a multi-image lens having two or more facets, each facet imaging the objects along a different optical axis;
    an image capturing means in optical communication with the different optical axes for capturing the imaged objects from each of the two or more facets; and
    means for sequentially isolating one of the images from each of the two or more facets of the multi-image lens, such that only the isolated image is incident upon the image capturing means;
    wherein the means for sequentially isolating one of the images from each of the two or more facets of the multi-image lens comprises:
    an electrochromic shutter associated with each of the two or more facets; and
    a processor for sequentially closing all but one of the electrochromic shutters.

17. An endoscope comprising:
    a charged coupled device (CCD) in optical communication with a scene along an optical path;

a multi-image lens disposed in the optical path, the multi-image lens having two or more facets, each facet transmitting an image of the scene to the CCD; and a device which isolates one of the images from each of the two or more facets, such that only the isolated image is incident upon the image capturing means at any instant; wherein the device comprises:

an electrochromic shutter associated with each of the two or more facets; and a processor for sequentially closing all but one of the electrochromic shutters.

* * * * *